(12) United States Patent
Ogawa et al.

(10) Patent No.: US 10,325,214 B2
(45) Date of Patent: Jun. 18, 2019

(54) PHYSICAL QUANTITIES PREDICTION APPARATUS AND METHOD

(71) Applicant: FUJITSU LIMITED, Kawasaki-shi, Kanagawa (JP)

(72) Inventors: Masatoshi Ogawa, Zama (JP); Takeo Kasajima, Machida (JP); Hiroshi Endo, Isehara (JP); Hiroyuki Fukuda, Yokohama (JP); Masao Kondo, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 700 days.

(21) Appl. No.: 15/044,744

(22) Filed: Feb. 16, 2016

(65) Prior Publication Data

US 2016/0260018 A1  Sep. 8, 2016

(30) Foreign Application Priority Data

Mar. 6, 2015  (JP) .................................. 2015-044798

(51) Int. Cl.
G06N 5/04 (2006.01)

(52) U.S. Cl.
CPC ...................... *G06N 5/04* (2013.01)

(58) Field of Classification Search
CPC .......... F24F 11/30; F24F 11/63; G06Q 50/06; G05D 23/1917; G06N 99/005
USPC ............................................. 703/6
See application file for complete search history.

(56) References Cited

U.S. PATENT DOCUMENTS

| 2012/0116740 A1* | 5/2012 | Fourno | E21B 43/00 703/10 |
| 2015/0134123 A1* | 5/2015 | Obinelo | G05B 15/02 700/277 |
| 2015/0248118 A1* | 9/2015 | Li | F24F 11/30 700/295 |

(Continued)

FOREIGN PATENT DOCUMENTS

| JP | 2005-157829 | 6/2005 |
| JP | 2009-076037 A | 4/2009 |
| JP | 2011-258620 A | 12/2011 |

OTHER PUBLICATIONS

JPOA—Office Action of Japanese Patent Application No. 2015-044798 dated Jan. 8, 2019, with English translation. **JP2009-76037 cited in the CNOA was previously submitted in the IDS filed on Feb. 16, 2016.

*Primary Examiner* — Suzanne Lo
(74) *Attorney, Agent, or Firm* — Fujitsu Patent Center

(57) ABSTRACT

An information processing apparatus includes a database configured to store a plurality of physical quantities in time-series, a processor, and a memory storing a program causing the processor to execute acquiring the plurality of physical quantities, selecting first explanatory variates, selecting second explanatory variates, generating past case data by acquiring the physical quantities corresponding to the objective variates and an input variate group of the first explanatory variates and the second explanatory variates, searching for predetermined pieces of past case data in the sequence from the shortest of the inter-vector distances, building up the second model from the input variate group in the predetermined pieces of searched past case data and from the objective variates, and predicting values of objective variates from the second model.

9 Claims, 25 Drawing Sheets

(56) References Cited

U.S. PATENT DOCUMENTS

2016/0004798 A1* 1/2016 Crawford ............ G06F 17/5009
705/14.17

* cited by examiner

FIG.8

| DATE & TIME | VARIABLE 1 | VARIABLE 2 | ... | VARIABLE n | ... | VARIABLE N |
|---|---|---|---|---|---|---|
| $t_1$ | $z_1(t_1)$ | $z_2(t_1)$ | ... | $z_n(t_1)$ | ... | $z_N(t_1)$ |
| $t_2$ | $z_1(t_2)$ | $z_2(t_2)$ | ... | $z_n(t_2)$ | ... | $z_N(t_2)$ |
| $t_3$ | $z_1(t_3)$ | $z_2(t_3)$ | ... | $z_n(t_3)$ | ... | $z_N(t_3)$ |
| ... | ... | ... | ... | ... | ... | ... |
| $t_m$ | $z_1(t_m)$ | $z_2(t_m)$ | ... | $z_n(t_m)$ | ... | $z_N(t_m)$ |
| ... | ... | ... | ... | ... | ... | ... |
| $t_M$ | $z_1(t_M)$ | $z_2(t_M)$ | ... | $z_n(t_M)$ | ... | $z_N(t_M)$ |

FIG.9

| DATE & TIME | VARIABLE 1 | VARIABLE 1 BEFORE ONE PERIOD | VARIABLE 1 BEFORE TWO PERIODS | VARIABLE 1 BEFORE THREE PERIODS |
|---|---|---|---|---|
| $t_1$ | $z_1(t_1)$ | $z_1(t_2)$ | $z_1(t_3)$ | $z_1(t_4)$ |
| $t_2$ | $z_1(t_2)$ | $z_1(t_3)$ | $z_1(t_4)$ | $z_1(t_5)$ |
| $t_3$ | $z_1(t_3)$ | $z_1(t_4)$ | $z_1(t_5)$ | $z_1(t_6)$ |
| ... | ... | ... | ... | ... |
| $t_m$ | $z_1(t_m)$ | $z_1(t_{m+1})$ | $z_1(t_{m+2})$ | $z_1(t_{m+3})$ |
| ... | ... | ... | ... | ... |
| $t_{M-3}$ | $z_1(t_{M-3})$ | $z_1(t_{M-2})$ | $z_1(t_{M-1})$ | $z_1(t_M)$ |

FIG.12

| DATA NUMBER | INPUT VECTOR | | | | | | | OUTPUT VECTOR |
|---|---|---|---|---|---|---|---|---|
| | INPUT VARIABLE 1 | INPUT VARIABLE 2 | ... | INPUT VARIABLE i | ... | INPUT VARIABLE I | | OUTPUT VARIABLE |
| $k_1$ | $x_1(k_1)$ | $x_2(k_1)$ | ... | $x_i(k_1)$ | ... | $x_I(k_1)$ | | $y(k_1)$ |
| $k_2$ | $x_1(k_2)$ | $x_2(k_2)$ | ... | $x_i(k_2)$ | ... | $x_I(k_2)$ | | $y(k_2)$ |
| $k_3$ | $x_1(k_3)$ | $x_2(k_3)$ | ... | $x_i(k_3)$ | ... | $x_I(k_3)$ | | $y(k_3)$ |
| ... | ... | ... | ... | ... | ... | ... | | ... |
| $k_m$ | $x_1(k_m)$ | $x_2(k_m)$ | ... | $x_i(k_m)$ | ... | $x_I(k_m)$ | | $y(k_m)$ |
| ... | ... | ... | ... | ... | ... | ... | | ... |
| $k_M$ | $x_1(k_M)$ | $x_2(k_M)$ | ... | $x_i(k_M)$ | ... | $x_I(k_M)$ | | $y(k_M)$ |

FIG. 13A

| TIME | INPUT VECTOR (INPUT VARIABLE GROUP) | | | | | OUTPUT VECTOR (OUTPUT VARIABLE GROUP) |
|---|---|---|---|---|---|---|
| | VARIABLE OF AREA 23 AT PRESENT | VARIABLE OF AREA 68 BEFORE 210 SEC | VARIABLE OF AREA 61 BEFORE 300 SEC | ... | FanB BEFORE 300 SEC | AREA 31 AFTER 30 SEC |
| $t_1$ | $z_{23}(t_1)$ | $z_{68}(t_1-210)$ | $z_{61}(t_1-300)$ | ... | $z_{FanB}(t_1-300)$ | $z_{31}(t_1+30)$ |
| $t_2$ | $z_{23}(t_2)$ | $z_{68}(t_2-210)$ | $z_{61}(t_2-300)$ | ... | $z_{FanB}(t_2-300)$ | $z_{31}(t_2+30)$ |
| $t_3$ | $z_{23}(t_3)$ | $z_{68}(t_3-210)$ | $z_{61}(t_3-300)$ | ... | $z_{FanB}(t_3-300)$ | $z_{31}(t_3+30)$ |
| ... | ... | ... | ... | ... | ... | ... |
| $t_M$ | $z_{23}(t_M)$ | $z_{68}(t_M-210)$ | $z_{61}(t_M-300)$ | ... | $z_{FanB}(t_M-300)$ | $z_{31}(t_M+30)$ |
| $t_q$ | $z_{23}(t_q)$ | $z_{68}(t_q-210)$ | $z_{61}(t_q-300)$ | ... | $z_{FanB}(t_q-300)$ | |

REQUEST POINT DATA

FIG.13B

| DATA NUMBER | INPUT VECTOR (INPUT VARIABLE GROUP) | | | | | OUTPUT VECTOR (OUTPUT VARIABLE GROUP) |
|---|---|---|---|---|---|---|
| | VARIABLE OF AREA 23 AT PRESENT | VARIABLE OF AREA 68 BEFORE 210 SEC | VARIABLE OF AREA 61 BEFORE 300 SEC | ... | *FanB* BEFORE 300 SEC | AREA 31 AFTER 30 SEC |
| $k_1$ | $x_1(k_1)$ | $x_2(k_1)$ | $x_3(k_1)$ | ... | $x_1(k_1)$ | $y(k_1)$ |
| $k_2$ | $x_1(k_2)$ | $x_2(k_2)$ | $x_3(k_2)$ | ... | $x_1(k_2)$ | $y(k_2)$ |
| $k_3$ | $x_1(k_3)$ | $x_2(k_3)$ | $x_3(k_3)$ | ... | $x_1(k_3)$ | $y(k_3)$ |
| ... | ... | ... | ... | ... | ... | ... |
| $k_M$ | $x_1(k_M)$ | $x_2(k_M)$ | $x_3(k_M)$ | ... | $x_1(k_M)$ | $y(k_M)$ |
| $k_q$ | $x_1(k_q)$ | $x_2(k_q)$ | $x_3(k_q)$ | ... | $x_1(k_q)$ | |

REQUEST POINT DATA

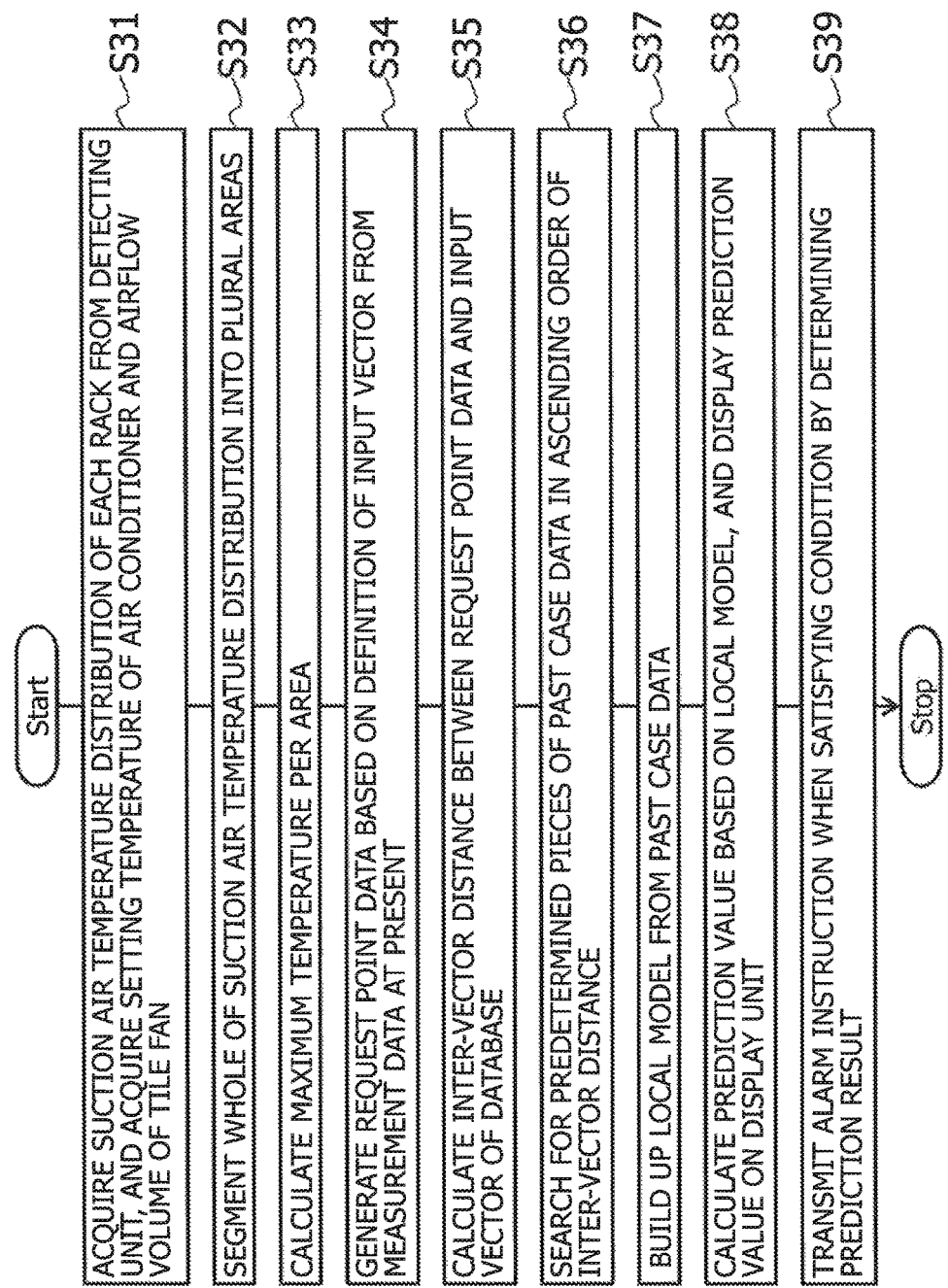

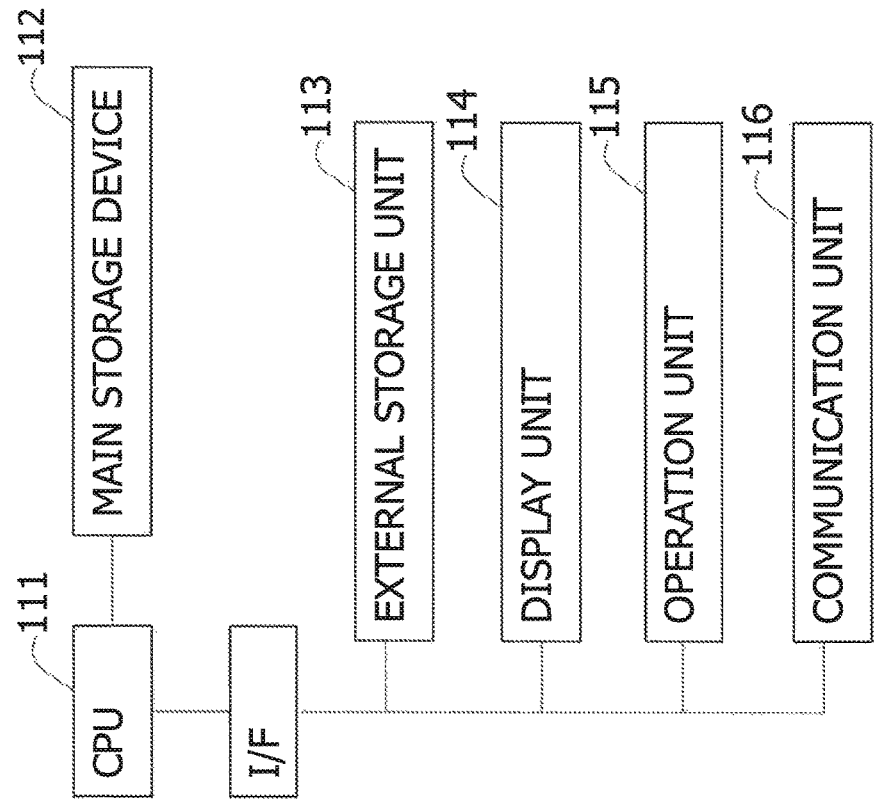

FIG.17

| No. | VARIABLE NAME | TIME DELAY (SEC) | CONTRIBUTION RATIO (F-VALUE) |
|---|---|---|---|
| 1 | FanA | 0 | 297.7 |
| 2 | Area 18 | 0 | 152.4 |
| 3 | Area 0 | 150 | 102.7 |
| 4 | Area 38 | 90 | 84.7 |
| 5 | Area 52 | 0 | 72.3 |
| 6 | Area 59 | 0 | 49.7 |
| 7 | Area 76 | 240 | 48.3 |
| 8 | Area 20 | 300 | 48.2 |
| 9 | Area 63 | 300 | 47.9 |
| 10 | Area 64 | 300 | 47.0 |
| 11 | Area 36 | 300 | 44.0 |
| 12 | Area 61 | 120 | 42.5 |
| 13 | Area 5 | 300 | 41.3 |
| 14 | Area 39 | 210 | 40.1 |
| 15 | Area 7 | 90 | 39.3 |
| 16 | Area 68 | 0 | 34.5 |
| 17 | Area 43 | 300 | 31.9 |
| 18 | Area 48 | 120 | 31.8 |
| 19 | Area 53 | 300 | 30.9 |
| 20 | Area 67 | 270 | 28.1 |
| 21 | Area 66 | 300 | 27.8 |
| 22 | Area 39 | 0 | 27.3 |
| 23 | Area 65 | 270 | 26.7 |
| 24 | Area 4 | 300 | 26.5 |
| 25 | Area 52 | 210 | 25.8 |
| 26 | Area 46 | 300 | 25.5 |
| 27 | Area 18 | 120 | 25.1 |
| 28 | Area 51 | 210 | 24.7 |
| 29 | Area 3 | 300 | 24.0 |
| 30 | Area 54 | 270 | 23.1 |
| 31 | Area 64 | 90 | 23.1 |
| 32 | Area 33 | 300 | 21.7 |
| 33 | Area 27 | 60 | 21.5 |
| 34 | Area 22 | 300 | 21.0 |

FIG.18

| No. | VARIABLE NAME | TIME DELAY (SEC) | CONTRIBUTION RATIO (F-VALUE) |
|---|---|---|---|
| 1 | FanA | 0 | 336 |
| 2 | FanB | 0 | 132 |
| 3 | FanA | 30 | 79 |
| 4 | FanB | 300 | 43 |

FIG.19

| No. | VARIABLE NAME | TIME DELAY (SEC) | CONTRIBUTION RATIO (F-VALUE) | Delay No. |
|---|---|---|---|---|
| 1 | Area 23 | 0 | 1699 | 0 |
| 2 | Area 68 | 210 | 160 | 7 |
| 3 | Area 61 | 300 | 159 | 10 |
| 4 | Area 48 | 270 | 99 | 9 |
| 5 | Area 7 | 0 | 96 | 0 |
| 6 | Area 47 | 180 | 88 | 6 |
| 7 | Area 17 | 120 | 84 | 4 |
| 8 | Area 41 | 150 | 82 | 5 |
| 9 | Area 5 | 300 | 71 | 10 |
| 10 | Area 55 | 300 | 69 | 10 |
| 11 | Area 68 | 0 | 62 | 0 |
| 12 | Area 59 | 300 | 60 | 10 |
| 13 | Area 58 | 300 | 54 | 10 |
| 14 | Area 3 | 300 | 43 | 10 |
| 15 | Area 38 | 30 | 41 | 1 |
| 16 | Area 30 | 90 | 39 | 3 |
| 17 | Area 35 | 240 | 38 | 8 |
| 18 | Area 6 | 0 | 36 | 0 |
| 19 | Area 69 | 120 | 36 | 4 |
| 20 | Area 0 | 180 | 35 | 6 |
| 21 | Area 74 | 30 | 32 | 1 |
| 22 | Area 12 | 300 | 28 | 10 |
| 23 | FanA | 0 | 336 | 0 |
| 24 | FanA | 30 | 132 | 1 |
| 25 | FanB | 0 | 79 | 0 |
| 26 | FanB | 300 | 43 | 10 |

PHYSICAL QUANTITIES PREDICTION APPARATUS AND METHOD

CROSS-REFERENCE TO RELATED APPLICATION

This application is based upon and claims the benefit of priority of the prior Japanese Patent Application No. 2015-044798, filed on Mar. 6, 2015, the entire contents of which are incorporated herein by reference.

FIELD

The embodiments discussed herein are related to a physical quantities prediction apparatus and method.

BACKGROUND

In recent years, with an arrival of high-level information society, computers have come to deal with a large quantity of data. A facility instanced by a data center and other equivalent facilities has increasingly and collectively managed a multiplicity of computers installed indoors. For example, the data center installs a multiplicity of server racks into a computer room, and the multiplicity of computers (servers) is stored in the respective server racks. A large amount of jobs are organically distributed to the computers, corresponding to operation statuses of the plurality of computers, and thus efficiently processed.

By the way, the computer generates heat as being operated. A rise of temperature within the computer causes a malfunction and a failure, and therefore the computer uses a built-in fan. The built-in fan takes cool air into the computer of the server rack, and the heat generated in the computer is discharged outside the computer. Generally, the built-in fan of the computer is operated under map table control based on an exothermic temperature of the computer in many cases.

On the other hand, an operator sets target values of a blowout temperature and a blowout airflow volume in a cooling system of an air conditioner so that a temperature of suction air sucked into each of the computer of every rack satisfies a value equal to or lower than the predetermined temperature. It is herein considered to assist the operator in operating the air conditioner through a prediction result by predicting a state of a future temperature of the suction air based on a prediction model. For example, a model prediction control method frequently uses a transfer function in the prediction model.

PATENT DOCUMENT

[Patent document 1] Japanese Laid-Open Patent Publication No. 2009-76037
[Patent document 2] Japanese Laid-Open Patent Publication No. 2011-258620

SUMMARY

One aspect of the embodiments is exemplified by an information processing apparatus described below. To be specific, the information processing apparatus includes a database configured to store a plurality of physical quantities acquired in time-series together with time.

The information processing apparatus further includes a processor and a memory storing a program causing the processor to execute acquiring the plurality of physical quantities in time-series, extracting, as one or more explanatory variates, one or more physical quantities becoming factors for variations of one or more objective variates with respect to the one or more objective variates set from one or more prediction target physical quantities in the plurality of physical quantities, selecting such one or more first explanatory variates as to minimize errors between actual values of the physical quantities set in the one or more objective variates and prediction values of a first model based on the one or more objective variates when presuming the first model from the one or more explanatory variates, selecting such one or more second explanatory variates as to minimize errors between the actual values of the physical quantities set in the one or more objective variates and prediction values of a second model based on one or more objective variates when presuming the second model added to the first model by setting, as the explanatory variates, the physical quantities other than the physical quantities selected as the one or more first explanatory variates in the plurality of physical quantities, generating past case data by acquiring, from the database, the physical quantities corresponding to the one or more objective variates and an input variate group of the first explanatory variates and the second explanatory variates, setting, when the prediction is requested, the current physical quantities corresponding to the input variate group in the input vectors for predicting the one or more objective variates, calculating inter-vector distances between the input vectors and the input variate group in the past case data, searching for predetermined pieces of past case data in the sequence from the shortest of the inter-vector distances, building up the second model from the input variate group in the predetermined pieces of searched past case data and from the one or more objective variates, predicting values of the one or more objective variates from the second model, and indicating the predicted values of the one or more objective variates.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 8 is a diagram illustrating an example of data stored in a large-scale database;

FIG. 9 is a diagram illustrating an example of generating a variable with time being delayed;

FIG. 12 is a diagram illustrating an example of storing data in an I/O vector database;

FIG. 13A is a diagram of another data example (time base) of the I/O vector database;

FIG. 13B is a diagram of still another data example (data number) of the I/O vector database;

FIG. 14 is a flowchart illustrating a process of a prediction processing unit;

FIG. 15 is a diagram illustrating a hardware configuration of an information processing apparatus applied to the temperature management system;

FIG. 17 is a diagram illustrating a conventional example of selecting an input variable;

FIG. 18 is a diagram illustrating a combination of variables selected based on a result of the stepwise procedure;

FIG. 19 is a diagram illustrating a combination of variables selected based on a result of a modified stepwise procedure;

DESCRIPTION OP EMBODIMENTS

In the actual facility instanced by the data center and other equivalent facilities, an equipment layout and server installation positions are changed on a daily basis in the facility. When a prediction target configuration instanced by the equipment layout and the server installation positions varies, an error between the prediction value of the prediction model and an actual value occurs in the conventional prediction model of the transfer function. This error results in a problem that temperature prediction performance is insufficient for the control using the prediction value and for the control assistance according to conventional technologies. It does not, however, mean that this type of problem is limited to the temperature prediction of the computer and other equivalent apparatuses, and the problem may also arise in predicting a variety of physical quantities.

Figure 1:
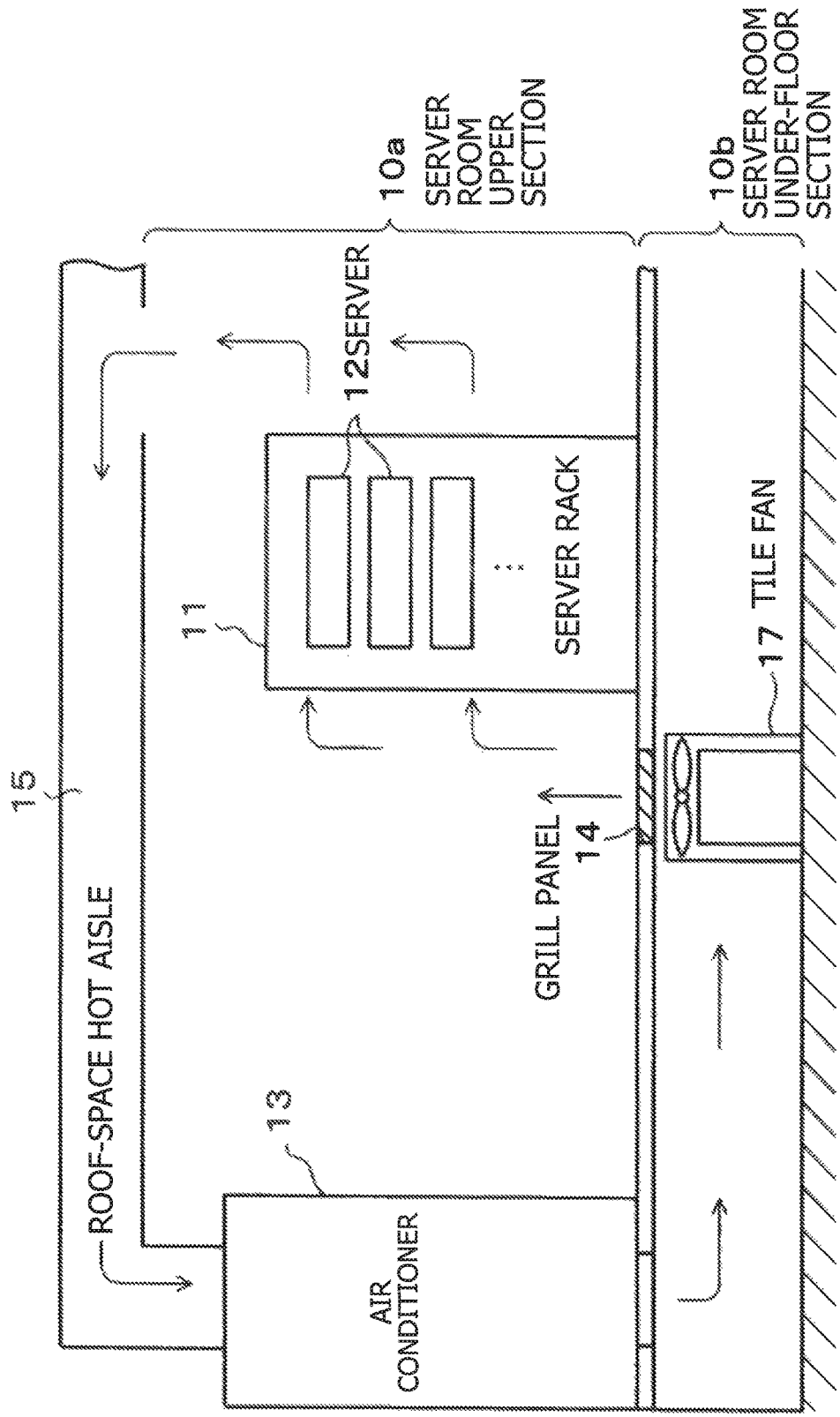
FIG. 1 is a schematic side view illustrating one example of a data center to which a temperature management system is applied.
Figure 2:
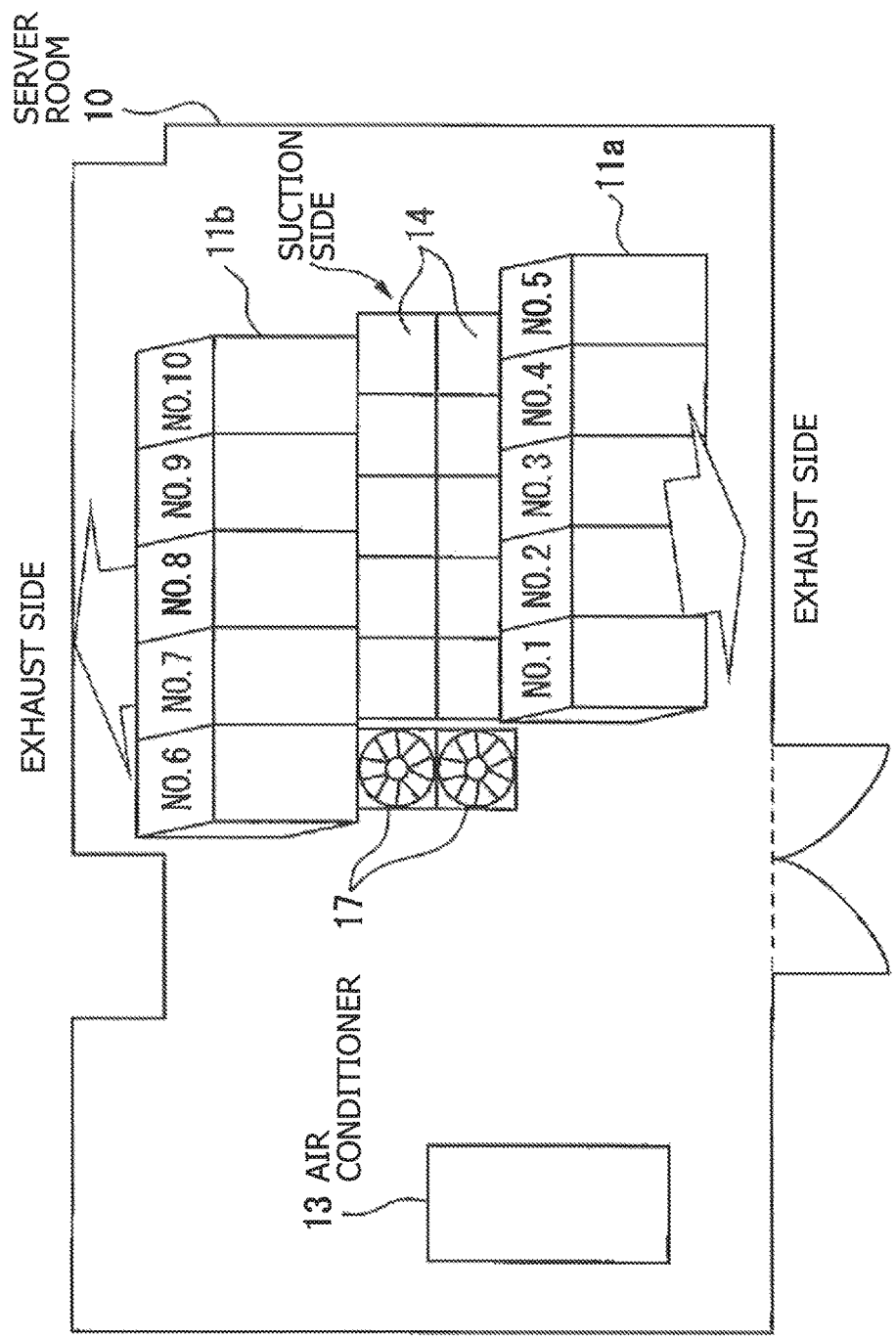
FIG. 2 is a schematic plan view of the data center.

A temperature management system according to one embodiment will hereinafter be described with reference to the drawings. FIG. 1 is a schematic side view illustrating one example of a data center to which the temperature management system according to the embodiment is applied, and FIG. 2 is a schematic plan view that likewise illustrates this data center. Note that cool air of an air conditioner, e.g., flows under a floor and further flows to an air suction side of a computer from under the floor to cool down the computer, a server and other equivalent equipment in the data center according to the embodiment. Herein, the "air suction side of the computer" indicates a chassis surface side on which internal fans of the computer suck the cool air. Warmed exhaust air is discharged by the internal fans of the computer from another chassis surface opposite to the air suction side of the computer. The chassis surface from which the warmed air is discharged is called an "exhaust side".

As in FIG. 1, in the data center according to the embodiment, a server room 10 is separated into a server room upper section 10a, a server room under-floor section 10b, and a roof-space hot aisle 15. A server rack 11, a plurality of servers 12 stored in the server rack 11, and an air conditioner 13 are installed in the server room upper section 10a.

A grill panel 14 (vent holes) having a plurality of air gaps to let the cool air under the floor through to the server room upper section 10a is provided between the server room upper section 10a and the server room under-floor section 10b. A tile fan 17 including a built-in blower fan is provided in the server room under-floor section 10b, the tile fan serving to blast the cool air under the floor to the upper section of the server room via the grill panel 14.

The cool air blasted by the air conditioner 13 flows through the server room under-floor section 10b and is supplied to the suction side of the servers 12 in the server room upper section 10a via the grill panel 14. The tile fan 17 blasts the cool air toward the server room upper section 10a from the server room under-floor section 10b. The tile fan 17 is capable of switching over an airflow volume at four stages instanced by, "strong", "intermediate", "weak" and "OFF". The servers 12 suck the cool air fed via the grill panel 14 from one side surface of the chassis, and discharge the warmed exhaust air toward an opposite side surface. The warmed exhaust air is returned to the air conditioner 13 via the roof-space hot aisle 15. Note that the servers 12 are stored in the server rack 11. One chassis is configured to include the server rack 11 and the servers 12 stored in the server rack 11 on the whole.

As illustrated in FIG. 2, e.g., a rack row 11a and a rack row 11b of the server racks 11 are installed in parallel, while the grill panel 14 is interposed therebetween. The respective servers 12 of the rack rows 11a, 11b suck the cool air flowing from the tile fan 17. To be specific, the servers 12 of the rack rows 11a, 11b suck the cool air from the side surface face-to-face to each other, and discharge the warmed exhaust air from side surfaces on opposite sides thereof. In other words, in the example of FIG. 2, the servers 12 of the rack row 11a of the server racks 11 are arranged so that the exhaust sides correspond to front sides of the servers 12, while the suction sides correspond to back sides of the servers 12. While on the other hand, the servers 12 of the rack row 11b of the server racks 11 are arranged so that the suction sides correspond to the front sides of the servers 12, while the exhaust sides correspond to the back sides of the servers 12. Note that the suction side of the chassis for the servers 12 is also simply referred to as the suction side of the server rack 11. The embodiment is described on the assumption that the servers 12 are aggregated per server rack 11 and deemed to be one chassis, and the server rack 11 appears to suck the cool air.

Figure 3:
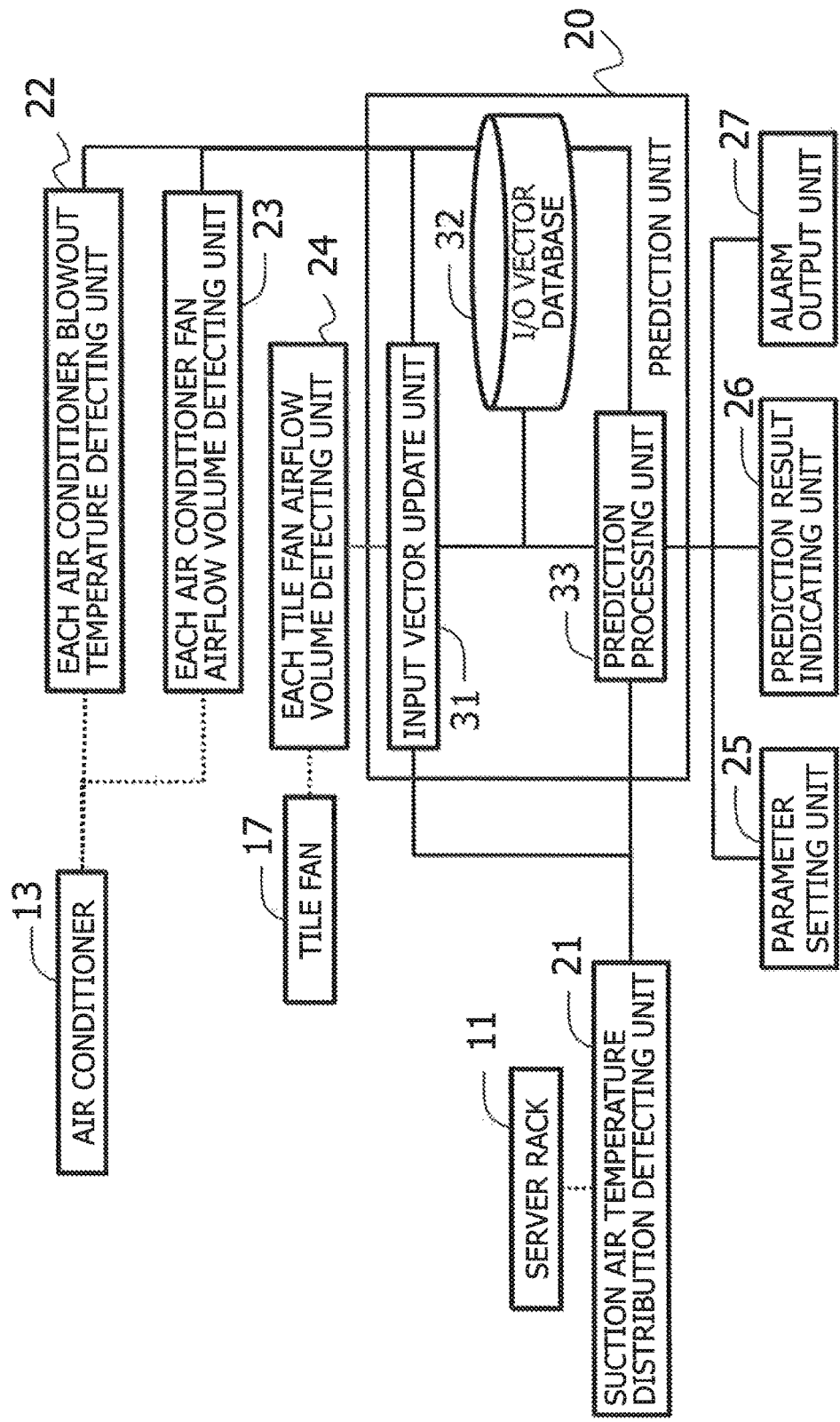
FIG. 3 is a block diagram illustrating a configuration of a temperature management system.

FIG. 3 is a block diagram illustrating a configuration of the temperature management system for an electronic equipment according to a first embodiment of the present invention. The temperature management system includes a prediction unit 20, a suction air temperature distribution detecting unit 21, each of air conditioner blowout temperature detecting units 22, each of air conditioner fan airflow volume detecting units 23, each of tile fan airflow volume detecting units 24, a parameter setting unit 25, a prediction result indicating unit 26, and an alarm output unit 27. The suction air temperature distribution detecting unit 21, each of the air conditioner blowout temperature detecting units 22, each of the air conditioner fan airflow volume detecting units 23, and each of the tile fan airflow volume detecting units 24 illustrate an "acquiring unit".

The prediction unit 20 calculates prediction values of physical quantities of a temperature of the suction air and other equivalent quantities, based on items of information given from the suction air temperature distribution detecting unit 21, each of the air conditioner blowout temperature detecting units 22, each of the air conditioner fan airflow volume detecting units 23, each of the tile fan airflow volume detecting units 24 and other equivalent units.

The suction air temperature distribution detecting unit 21 acquires temperatures on the suction side of the server rack 11 by measuring the temperatures at a plurality of points. For example, one or a plurality of temperature sensors is provided on a suction-sided wall surface of the chassis for each of the servers 12 in the server rack 11. The suction air temperature distribution detecting unit 21 acquires, as digital data, the temperatures measured by the temperature sensors on the suction-sided wall surfaces of the chassis for the respective server racks 11.

Each of the air conditioner blowout temperature detecting units 22 acquires a setting value of blowout temperature of the air conditioner 13 from a control unit within the air conditioner 13. Each of the air conditioner fan airflow volume detecting units 23 acquires a setting value of fan airflow volume of the air conditioner 13 from the control unit within the air conditioner 13. Each of the tile fan airflow volume detecting units 24 acquires a setting value of fan airflow volume of the tile fan 17 from the control unit of the tile fan 17. Note that a large-scale database 43 illustrated in FIG. 4 accumulates detected values given from the suction air temperature distribution detecting unit 21, each of the air conditioner blowout temperature detecting units 22, each of the air conditioner fan airflow volume detecting units 23, each of the tile fan airflow volume detecting units 24 and other equivalent units.

The parameter setting unit 25 acquires parameters used in the respective units within the temperature management system. The parameters are parameters for designating, e.g., a resolution, to be processed by the prediction unit 20, of a temperature distribution of the server rack 11, and are instanced by a segment count of a suction surface area of the server rack 11, a determination value for determining whether a temperature predicted by the prediction unit 20 is normal or abnormal, a threshold value used for determining whether an alarm is to be output, a threshold value of contribution ratio of an explanatory variable to be selected for a regression model, and other equivalent values.

The prediction result indicating unit 26 indicates a predicted value given from the prediction unit 20. The alarm output unit 27 outputs an alarm based on the predicted value given from the prediction unit 20. The alarm is instanced by a sound, a message and other equivalent elements.

The prediction unit 20 includes an input vector update unit 31, I/O vector database 32, and a prediction processing unit 33. The input vector update unit 31 generates the I/O vector database 32. The input vector is a combination of the detected values largely contributing to a prediction target output vector of the prediction unit 20 in the detected values accumulated in the large-scale database 43 of FIG. 4. The output vector is a combination of prediction target values of the prediction unit 20. The output vector is a future value associated with the detected values accumulated in the large-scale database 43 of FIG. 4, and is designated by, e.g., a user. However, the output vector may also be one variable, i.e., a scalar value.

The input vector update unit 31 defines, as the input vector, a combination of input variables x for expressing a prediction target output variable y or the output vector defined as a combination of output variables y. The prediction unit 20 stores, in the I/O vector database 32, the input vectors and the output vectors (output variables) as past case data by being associated with each other with respect to the detected values detected in the past and accumulated in the large-scale database 43 of FIG. 4. Accordingly, the I/O vector database 32 is a database that stores the defined input vectors and output vectors by being associated with each other as the past case data. The input variable is one example of an "input variate".

The prediction processing unit 33 acquires the past case data similar to a current system status from the I/O vector database 32. The prediction processing unit 33 builds up a local model based on the past case data, and makes a prediction by using the local model. The local model connotes, e.g., a model generated based on specified and partially limited items of data in the past case data, e.g., based on the past case data similar to the current system status.

Figure 4:
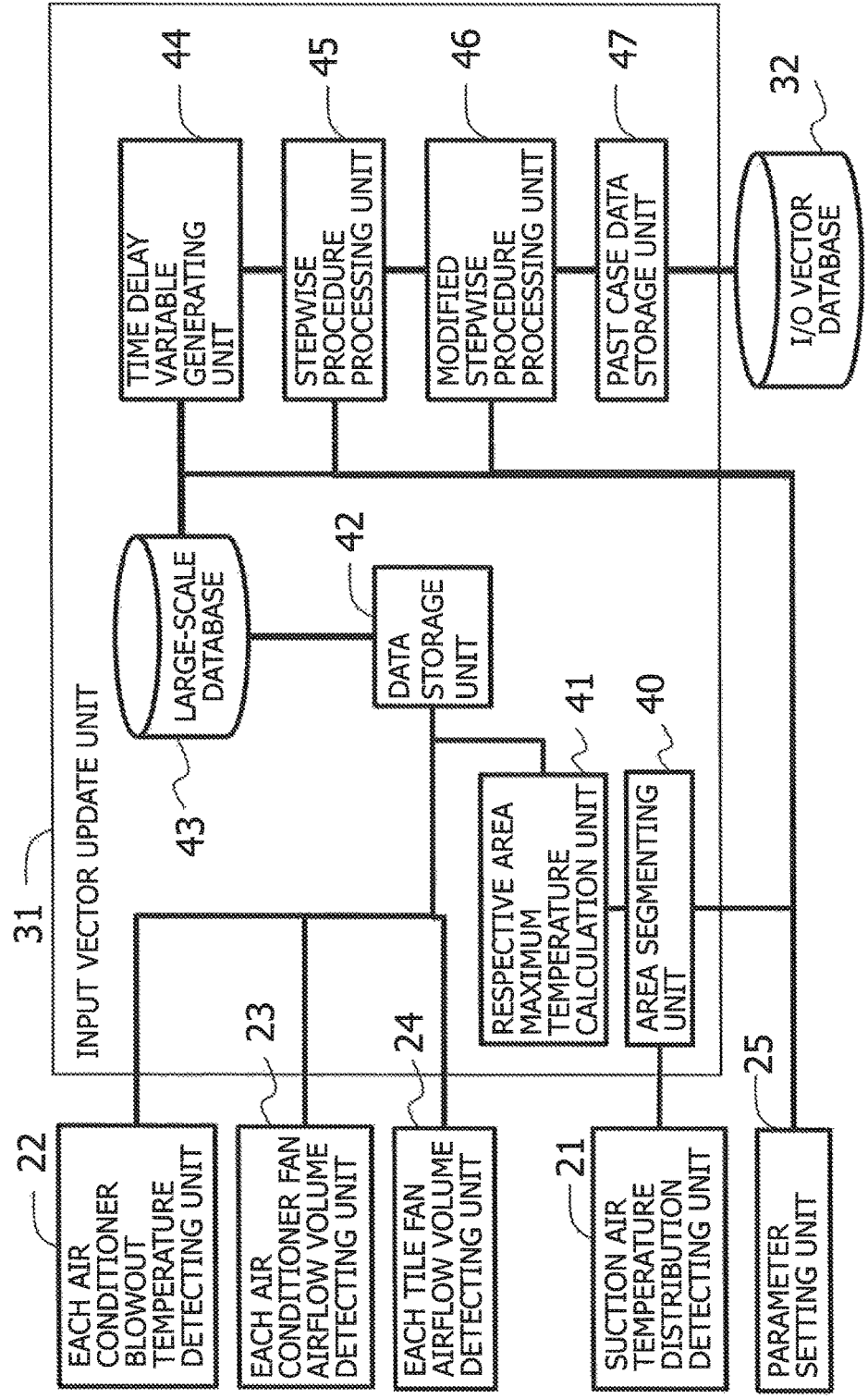
FIG. 4 is a diagram of a configuration of an input vector update unit.

FIG. 4 is a diagram of a configuration of the input vector update unit 31 of the temperature management system. The input vector update unit 31 includes an area segmenting unit 40, a respective area maximum temperature calculation unit 41, a data storage unit 42, the large-scale database 43, a time delay variable generating unit 44, a stepwise procedure processing unit 45, a modified stepwise procedure processing unit 46, and a past case data storage unit 47. The area segmenting unit 40, the respective area maximum temperature calculation unit 41 and the data storage unit 42 illustrate the "acquiring unit". The large-scale database 43 is one example of a "database". The stepwise procedure processing unit 45 is one example of a "first selection unit". The modified stepwise procedure processing unit 46 is one example of a "second selection unit". The past case data storage unit 47 is one example of a "generating unit".

The area segmenting unit 40 acquires a segment count from the parameter setting unit 25, and segments data of the suction temperature distribution detected by the suction air temperature distribution detecting unit 21 into data per segment area segmented by the segment count. For example, the area segmenting unit 40 laterally segments the suction surface of the server rack 11 equally by two into a right surface and a left surface, and further vertically segments the right and left surfaces equally by four into totally eight segment areas.

The respective area maximum temperature calculation unit 41 calculates a maximum temperature per segment area into which the suction surface is segmented by the area segmenting unit 40. The use of the maximum temperature is for specifying a variation range containing a worst case of a high temperature value of the server rack 11, i.e., the server 12.

The data storage unit 42 sequentially accumulates, per sampling period in the large-scale database 43, the detected values detected by each of the air conditioner blowout temperature detecting units 22, each of the air conditioner fan airflow volume detecting units 23 and each of the tile fan airflow volume detecting units 24, and each segment area maximum temperature data given from the respective area maximum temperature calculation unit 41 respectively. The thus-accumulated detected values and the maximum temperature data of the segment areas become time-series data.

The time-series data is also called variable data. The large-scale database 43 stores the variable data on a per time basis from the present down to the past.

The time delay variable generating unit 44 generates a variable with the time being delayed with respect to the variable data stored in the large-scale database 43. The time delay variable generating unit 44 acquires a count of the times (periods) to be delayed from the parameter setting unit 25. Note that the temperature management system deals with the measured values, which are of the same type of physical quantity but are different in time delay, as different variables. For example, a temperature tx(t) in a position x and a temperature tx(t−T1) having a time delay T are dealt with as the different variables. With respect to these two variables, the time delay variable generating unit 44 generates variables with the time being delayed, respectively. The variables with the time being delayed are, e.g., tx(t1), tx(t2), . . . and tx(t1−T1), tx(t2−T1), . . . .

The stepwise procedure processing unit 45 presumes the regression model for predicting a prediction target from the variables becoming control factors in the variables generated by the time delay variable generating unit 44, and selects such a combination of explanatory variables as to minimize an error between the predicted value of the model and an actual value. The variable becoming the control factor represents a variable of the factor (control quantity) to control a controlled quantity that is to be controlled under the control. For example, the variable in flow rate control is a variable of physical quantity instanced by a valve opening for controlling the flow rate. The regression model is one example of a "first model". Herein, the regression model includes models based on a multiple regression analysis. The combination of explanatory variables is one example of a "first explanatory variate".

The stepwise procedure processing unit 45, when using a stepwise procedure, acquires the threshold value of the contribution ratio in the stepwise procedure from the parameter setting unit 25, and selects the variable larger than the contribution ratio. The contribution ratio, which is also called an F-value, a t-value and a variance ratio, is a scale for measuring how much a residual sum of squares of the calculated value of the model and the actual value decreases, e.g., in the regression model, and is also a numerical value indicating a degree of how much each variable contributes to an object variable (predicted value). The contribution ratio is calculated per variable from the residual sum of squares based on the model when each variable is added to the model and from the residual sum of squares based on the model when not added. An implication is that the variable having a higher contribution ratio contributes to accuracy of the object variable (predicted value) at a higher rate.

The modified stepwise procedure processing unit 46, in addition to the control variable selected by the stepwise procedure processing unit 45, adds a variable other than the control variable. The modified stepwise procedure processing unit 46, when adding the variable, presumes the regression model for predicting the prediction target, selects such a combination of explanatory variables as to minimize the error value between the predicted value of the model and the actual value, and defines the selected variable group as the input vectors. Hence, the final input vectors include the control variable selected by the stepwise procedure processing unit 45 and the variable added by the modified stepwise procedure processing unit 46. For example, in the modified stepwise procedure into which the stepwise procedure is modified, the modified stepwise procedure processing unit 46 acquires the threshold value of the contribution ratio in the modified stepwise procedure from the parameter setting unit 25, and selects the variable larger than the contribution ratio. The variable to be added by the modified stepwise procedure processing unit 46 is one example of a "second explanatory variate".

The past case data storage unit 47 generates the past case data by associating the detected values of the prediction target output vectors with the detected values of the input vectors selected by the modified stepwise procedure processing unit 46. The past case data storage unit 47 stores the generated past case data on the per time basis in the I/O vector database 32.

Figure 5:
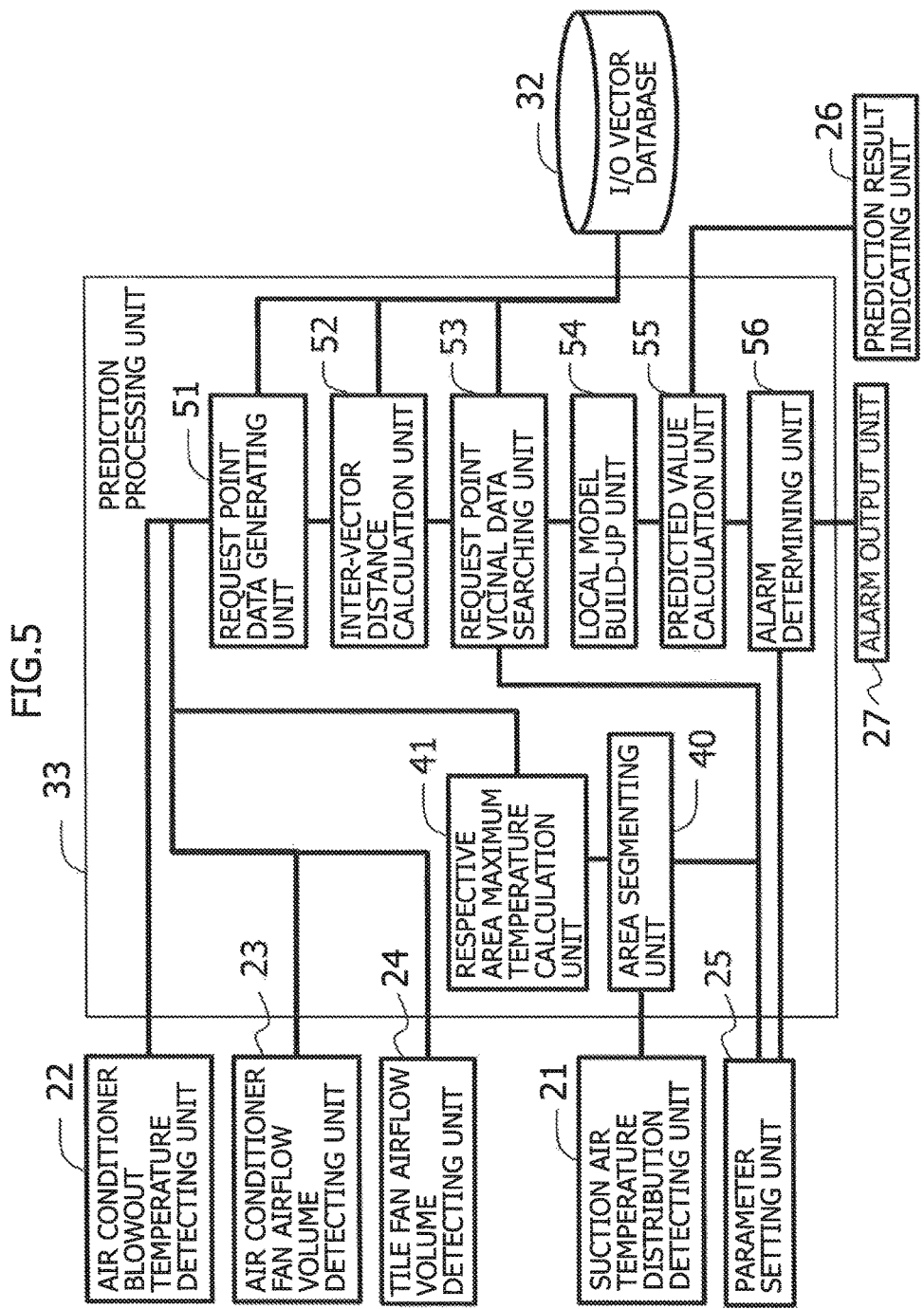
FIG. 5 is a diagram of a configuration of a prediction processing unit.

FIG. 5 is a diagram of a configuration of the prediction processing unit 33 in the temperature management system according to the first embodiment of the present invention. The prediction processing unit 33 includes the area segmenting unit 40, the respective area maximum temperature calculation unit 41, a request point data generating unit 51, an inter-vector distance calculation unit 52, a request point vicinal data searching unit 53, a local model build-up unit 54, a predicted value calculation unit 55, and an alarm determining unit 56. The area segmenting unit 40 and the respective area maximum temperature calculation unit 41 in FIG. 5 are the same as those in FIG. 4. The request point data generating unit 51 is one example of an "input setting unit". The inter-vector distance calculation unit 52 and the request point vicinal data searching unit 53 illustrate a "data searching unit". The local model build-up unit 54 is one example of a "build-up unit".

The request point data generating unit 51 generates the input vector at a latest time from the data detected by each of the air conditioner blowout temperature detecting units 22, each of the air conditioner fan airflow volume detecting units 23 and each of the tile fan airflow volume detecting units 24 and from the respective area maximum temperature data given by the respective area maximum temperature calculation unit 41 in accordance with the definitions of variables of the input vectors. Note that each of the air conditioner blowout temperature detecting units 22, each of the air conditioner fan airflow volume detecting units 23 and each of the tile fan airflow volume detecting units 24 may temporarily output the detected values and other equivalent values to the large-scale database 43 in FIG. 4, while the request point data generating unit 51 may generate the input vector at the latest time from the large-scale database 43. The request point data generating unit 51 stores the input vector at the latest time in the I/O vector database 32. The input vector at the latest time is called request point data.

The inter-vector distance calculation unit 52 calculates the inter-vector distance between the request point data and the respective input vectors in the I/O vector database 32. The request point vicinal data searching unit 53 acquires a setting count of the past cases to be searched for from the parameter setting unit 25. The request point vicinal data searching unit 53 searches for the past case data based on the distances calculated by the inter-vector distance calculation unit 52, thus acquiring the past case data by the setting count in the sequence from the smallest distance.

The local model build-up unit 54 builds up the model from the input vectors and the output vectors of the acquired past case data. The model to be built up is a model based on the past case data acquired by the predetermined count in the sequence from the smallest distance, and this model is called a local model. The local model is one example of a "second model".

The predicted value calculation unit 55 calculates the predicted value by use of the model built up by the local model build-up unit 54, and may display the calculated predicted value on a display unit and other equivalent displays. The alarm determining unit 56 acquires a threshold value for the alarm from the parameter setting unit 25. The alarm determining unit 56 instructs the alarm output unit 27 to output the alarm when the predicted value of the predicted value calculation unit 55 exceeds the threshold value.

Figure 6:
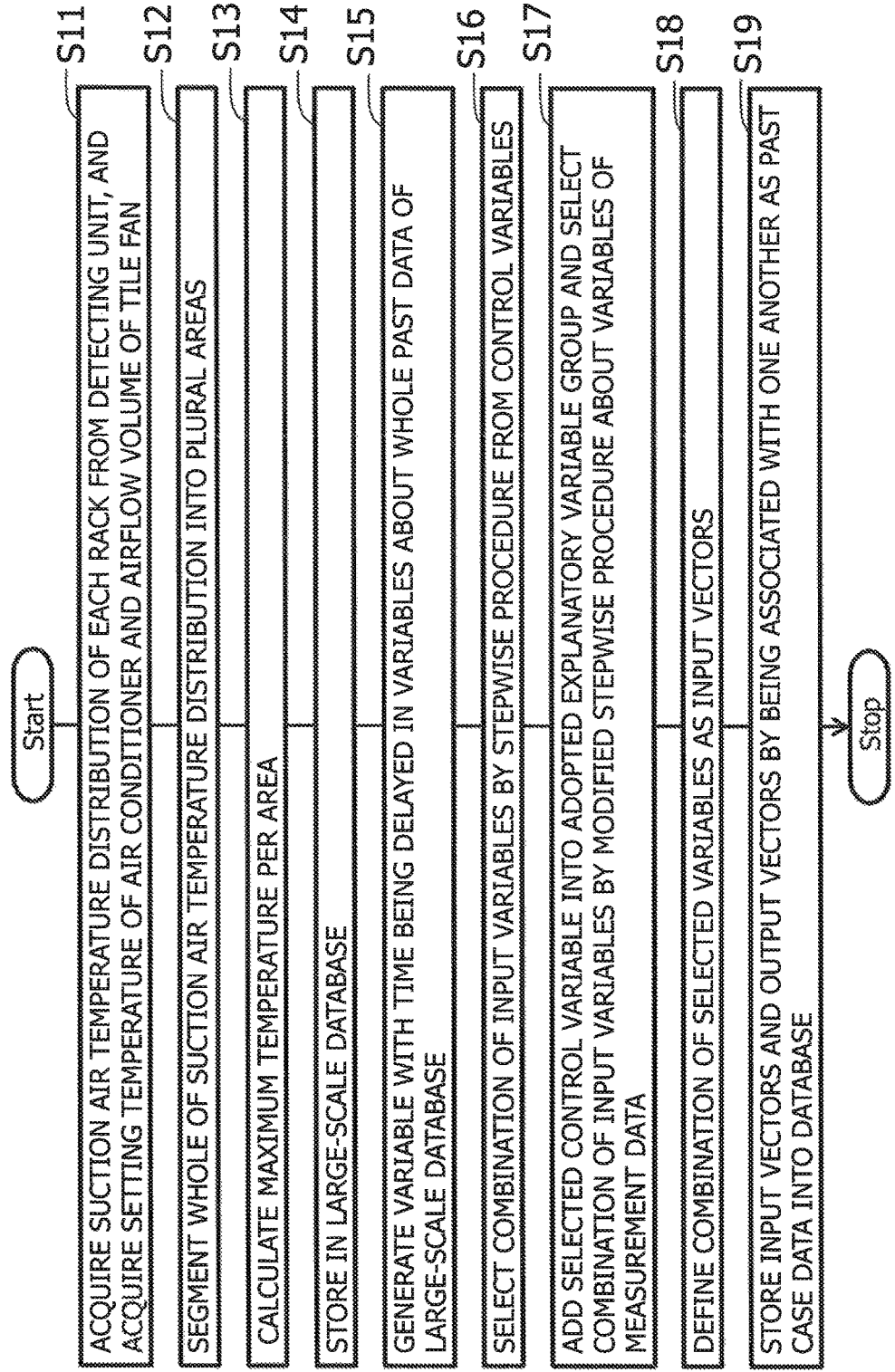
FIG. 6 is a flowchart illustrating processes of the input vector update unit.

FIG. 6 is a flowchart illustrating processes of the input vector update unit 31 according to the embodiment. The processes of the input vector update unit 31 are also called an input vector update method. The input vector update unit 31 executes a series of processes illustrated in FIG. 6 at an interval of a fixed period of time (e.g., once a day).

To start with, in step 11, the input vector update unit 31 acquires the detected values from each of the air conditioner blowout temperature detecting units 22, each of the air conditioner fan airflow volume detecting units 23, each of the tile fan airflow volume detecting units 24 and the suction air temperature distribution detecting unit 21. The input vector update unit 31 serving as one example of an "acquiring unit" executes the process in S11.

Figure 7:
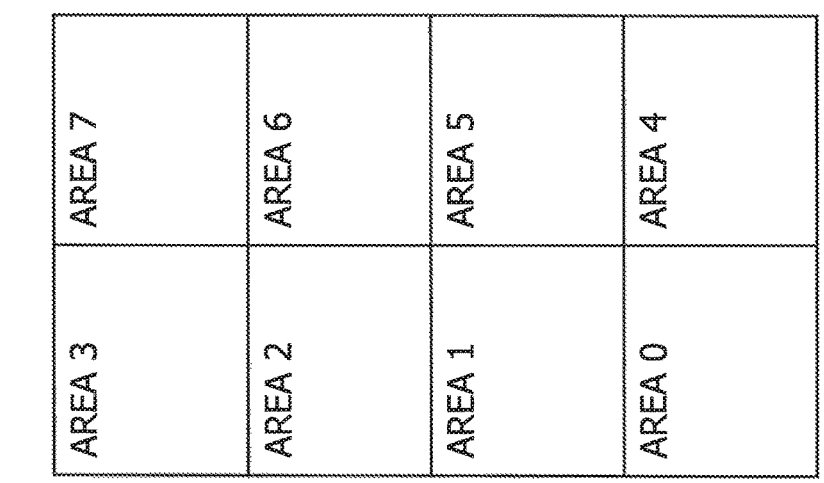
FIG. 7 is a diagram of a processing example of equally segmenting a suction surface of a server rack.

Next, in step S12, the area segmenting unit 40 of the input vector update unit 31 segments the suction surface of every server rack 11 into a predetermined number of segment areas. For example, the area segmenting unit 40 segments, as illustrated in FIG. 7, the suction surface of the single server rack 11 equally into eight segment areas. The area segmenting unit 40 executes the same process as in FIG. 7 with respect to the respective server racks.

Next, in step S13, the respective area maximum temperature calculation unit 41 of the input vector update unit 31 calculates the maximum temperatures of the respective segment areas. For example, the large-scale database 43 saves position coordinates per temperature sensor provided in each server within the server rack 11. The large-scale database 43 saves also the detected values per temperature sensor. Such being the case, it may be sufficient that the respective area maximum temperature calculation unit 41 acquires the maximum temperature in the detected values of the temperature sensor, which are contained in the respective segment areas.

Subsequently, in step S14, the data storage unit 42 of the input vector update unit 31 sequentially accumulates, in the large-scale database 43, the detected values detected by each of the air conditioner blowout temperature detecting units 22, each of the air conditioner fan airflow volume detecting units 23, each of the tile fan airflow volume detecting units 24 and the respective area maximum temperature data given from the respective area maximum temperature calculation unit 41 on a per data item basis and a per sampling period basis. As a result of the process in S14, the detected values per data item and the respective area maximum temperature data are dealt with as the variable data in time-series. FIG. 8 illustrates an example of the data stored in the large-scale database 43. As illustrated in FIG. 8, the large-scale database 43 stores the data at respective dates & times from time t1 to time tM for every set of N-number of variables zn(t).

Next, in step S15, the time delay variable generating unit 44 of the input vector update unit 31 generates variables with the time being delayed in the variables in the large-scale database 43. FIG. 9 depicts an example of generating the variables with the time being delayed with respect to a variable 1 (z1 (t) in the table). Generated are a value of the variable 1 before one period with the time for one period being delayed, a value of the variable 1 before two periods with the time for two periods being delayed, and a value of the variable 1 before three periods with the time for three periods being delayed with respect to the variable 1.

Next, in step S16, the stepwise procedure processing unit 45 presumes the regression model for predicting the prediction target from the variables (control variables) of the control factors in the variables with the time being delayed, which are generated in step S15. An in-depth description of a way of selecting the explanatory variables adopted for the regression model will be made in FIG. 10. The stepwise procedure processing unit 45 selects such a combination of explanatory variables as to minimize the error between the predicted value of the model and the actual value. Note that the explanatory variable is selected also from the detected values with the time being delayed (before a predetermined period) in step S16 in addition to the detected values of the respective variables illustrated in FIG. 8. This is because such an instance may arise that the detected value before the predetermined period from the present has a higher contribution ratio than the current detected value of each variable. For example, with respect to the variable affecting the output vector after a delay of the predetermined time, the detected value before the time being delayed from the present is assumed to have the large contribution ratio.

Note that in addition to the stepwise procedure, a method and other equivalent techniques using Akaike's Information Criterion are available as methods for selecting such a combination of explanatory variables as to minimize the error between the predicted value of the mode and the actual value on the presumption of using the regression model for predicting the prediction target.

Figure 10:
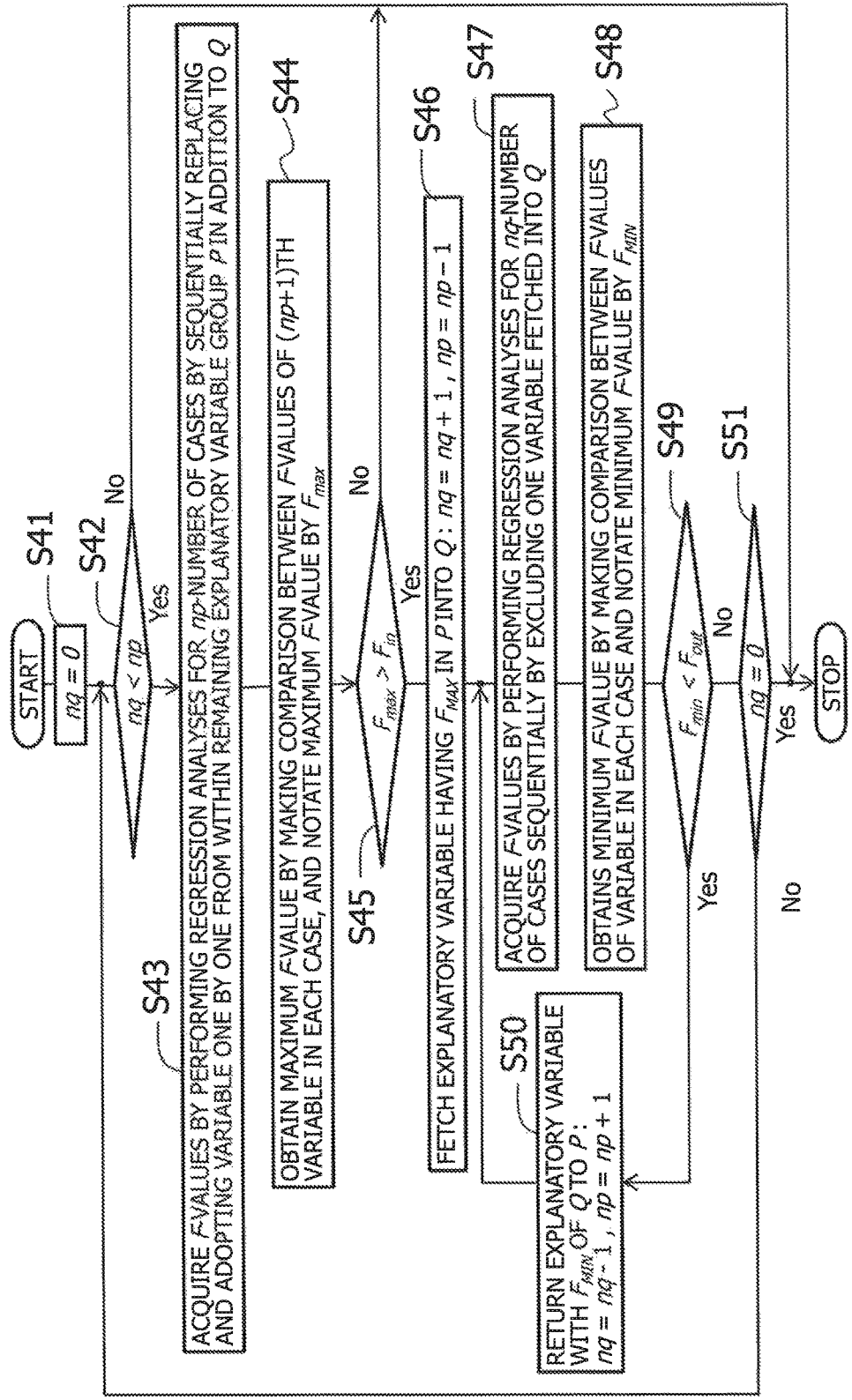
FIG. 10 is a flowchart illustrating details of a process based on a stepwise procedure.

FIG. 10 is a flowchart illustrating details of the process (S16 in FIG. 6) based on the stepwise procedure. In FIG. 10, a symbol P represents a first set explanatory variable group containing the control variables, np represents a number of variables of the first set explanatory variable group, Q denotes an adopted explanatory variable group fetched from the explanatory variable group P, and nq indicates a number of variables of the fetched adopted explanatory variable group Q. An initial value of the adopted explanatory variable group Q is, e.g., a null set. The stepwise procedure processing unit 45 serving as one example of a "first selection unit" executes processes in FIG. 10.

The stepwise procedure processing unit 45 substitutes "0" into np in S41. In S42, the stepwise procedure processing unit 45 determines whether a relationship of nq<np is established or not. When determined to be "Yes" in S42, the stepwise procedure processing unit 45 advances to the process in S43. Whereas when determined to be "No", the stepwise procedure processing unit 45 terminates the processing. A reason for the termination is that the entire variables of the explanatory variable group P have been fetched into the adopted explanatory variable group Q.

The stepwise procedure processing unit 45 performs regression analyses for an np-number of Cases by sequentially replacing and adopting the variables one by one from within the remaining explanatory variable group P in S43 in addition to the adopted explanatory variable group Q. The stepwise procedure processing unit 45 obtains an F-value of the variable adopted in each Case. Herein, the F-value connotes the contribution ratio to a result of the regression analysis of the adopted variable. The contribution ratio is calculated based on, e.g., the residual sum of squares of the predicted value and the actual value in each Case to increase the contribution ratio of the variable adopted in the Case having a small error.

In S44, the stepwise procedure processing unit 45 obtains the maximum F-value by making a comparison with the F-value of an (np+1)th variable in each Case. The stepwise procedure processing unit 45 notates the maximum F-value by $F_{max}$. In other words, what is obtained is the maximum F-value in the F-values of the variables added and adopted in the respective Cases in S43.

The stepwise procedure processing unit 45 acquires, from the parameter setting unit 25, and retains $F_{in}$ defined as the F-value of a criterion for determination when adopting the explanatory variable. The stepwise procedure processing unit 45 determines whether a relationship of $F_{max} > F_{in}$ is established in S45. When determined to be "Yes" in S45, the stepwise procedure processing unit 45 advances to the process in S46. Whereas when determined to be "No" in S45, the stepwise procedure processing unit 45 terminates the processing. A reason for the termination is that the set explanatory variable group P does not contain any variable having a contribution ratio F exceeding the criterion value $F_{in}$.

In S46, the stepwise procedure processing unit 45 fetches, into the adopted explanatory variable group Q, the variable having the contribution ratio $F_{max}$ as the adopted explanatory variable in the explanatory variable group P. The stepwise procedure processing unit 45 performs counting to establish nq=nq+1 and np=np−1.

In S47, the stepwise procedure processing unit 45 sets, as processing targets, the remaining variables from which to exclude each one variable fetched into the adopted explanatory variable group Q in the process of S46. With respect to the Case of excluding one by one the remaining variables of the adopted explanatory variable group Q, the regression analyses are performed sequentially for the np-number of Cases (by the number of variables before being counted up), thereby obtaining the F-values of the variables excluded in the respective Cases. In the process of S47, the stepwise procedure processing unit 45 searches for the variable that is desirable for being excluded from the explanatory variable group Q in place of the variable fetched into Q in S46.

In S48, the stepwise procedure processing unit 45 obtains the minimum F-value by making the comparison between the respective F-values of the variables excluded in the respective Cases. The stepwise procedure processing unit 45 notates the obtained minimum F-value by $F_{min}$.

The stepwise procedure processing unit 45 acquires, from the parameter setting unit 25, and retains an F-value $F_{out}$ of the criterion for determination when excluding the explanatory variables. The stepwise procedure processing unit 45 determines whether a relationship of $F_{min} < F_{out}$ is established. When determined to be "Yes" in S49, the stepwise procedure processing unit 45 diverts to the process in S50. Whereas when determined to be "No" in S49, the stepwise procedure processing unit 45 advances to the process in S51.

The stepwise procedure processing unit 45 returns, to the explanatory variable group P, the explanatory variable with the contribution ratio becoming $F_{min}$ in the explanatory variables contained in the explanatory variable group Q. The stepwise procedure processing unit 45 performs counting to establish q=q−1 and p=p+1, and loops back to the process in S47. In other words, the stepwise procedure processing unit 45 iterates the process of further excluding the explanatory variables. Thus, the stepwise procedure processing unit 45 iterates the processes in S46 through S50 till the explanatory variables with the contribution ratio being smaller than $F_{min}$ disappear.

The stepwise procedure processing unit 45 determines in S51 whether a relationship of nq=0 is established. When determined to be "Yes", the processing is finished. This is because the existing explanatory variable group Q remains to be the null set, and consequently the iteration of the processes has no meaning. Whereas when determined to be "No", the stepwise procedure processing unit 45 loops back to the process in S42. The stepwise procedure processing unit 45 continues the process of adding the explanatory variable next. To be specific, the stepwise procedure processing unit 45 repeats the processes in S42 through S49 for the remaining explanatory variable group P with respect to the adopted explanatory variable group Q to which the variable is newly added. The explanatory variable selected by the stepwise procedure processing unit 45 is one example of a "first explanatory variate".

Next, in step S17 of FIG. 6, the modified stepwise procedure processing unit 46 tries to add the explanatory variable other than the control variable in addition to the adopted explanatory variable based on the control variable selected by the stepwise procedure processing unit 45. The modified stepwise procedure processing unit 46, when adding the variable, presumes the regression model for predicting the prediction target. The modified stepwise procedure processing unit 46 selects the explanatory variable to be added so as to minimize the error value between the predicted value of the regression model and the actual value. Accordingly, the final input vectors are set as the adopted explanatory variable group selected by the modified stepwise procedure processing unit 46.

Figure 11:
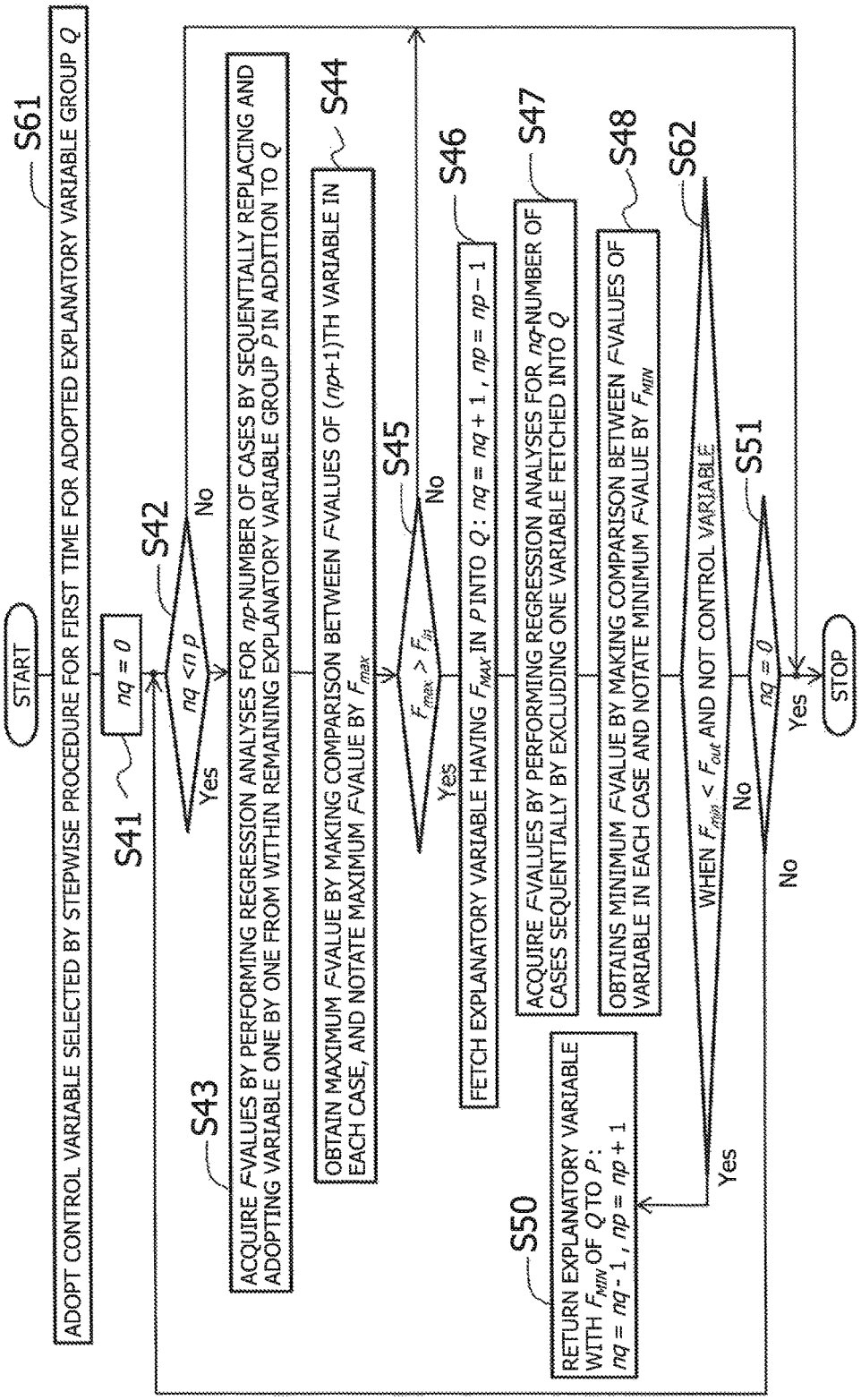
FIG. 11 is a flowchart illustrating details of a process of a modified stepwise procedure processing unit.

FIG. 11 is a flowchart illustrating details of the process (S17 in FIG. 6) by the modified stepwise procedure processing unit 46. In S61, the modified stepwise procedure processing unit 46 adopts, as an initial value of the adopted explanatory variable group Q, the variable or the variable group based on the control variable selected by the stepwise procedure in S16 of FIG. 6. In FIG. 11, processes in S41 through S48 are the same as the processes in FIG. 10 except a point that the initial value of the adopted explanatory variable group Q is set in S61. Such being the case, a detailed description of S41 through S48 is omitted. The modified stepwise procedure processing unit 46 serving as one example of a "second selection unit" executes the processes in FIG. 11.

In the processes of S41 through S48, the modified stepwise procedure processing unit 46 determines whether the explanatory variable can be further added in addition to the adopted explanatory variable group Q set in S61, and tries to add the explanatory variable. Note that the variable count nq initially set in S42, counted up in S46 and counted down in S50 is defined as a counter to count the number of variables to be added by the modified stepwise procedure processing unit 46. The F-value and $F_{max}$ to be calculated in S44 are calculated by using an nq-number of variables added in the processes of S41 through 662 in addition to the initial value (the explanatory variable group set in S61) of the adopted explanatory variable group Q.

The modified stepwise procedure processing unit 46 determines whether it is satisfied that the variable having the relationship of $F_{min} < F_{out}$ in 662 and having the contribution ratio becoming $F_{min}$ is not the control variable selected by the stepwise procedure in S16. When determined to be "Yes", the modified stepwise procedure processing unit 46 diverts to the process in S50. Whereas when determined to be "No", the modified stepwise procedure processing unit 46 advances to the process in S51. The modified stepwise procedure processing unit 46 executes the process in S62 as one example of "excluding a second explanatory variate having a contribution ratio not reaching a reference value".

In S50, the modified stepwise procedure processing unit 46 returns the explanatory variable having $F_{min}$ in the explanatory variable group Q to the remaining explanatory variable group P. the modified stepwise procedure processing unit 46 performs counting to establish nq=nq−1 and np=np+1, and loops back to the process in S47. On the other hand, the modified stepwise procedure processing unit 46 determines in S51 whether a relationship of nq=0 is established. When determined to be "Yes" in S51, the modified stepwise procedure processing unit 46 terminates the processing. Note that when determined to be "No" in S51, the modified stepwise procedure processing unit 46 loops back to the process in S42, and repeats the processes for further adding the explanatory variables. The explanatory variable added by the modified stepwise procedure processing unit 46 is one example of a "second explanatory variate".

Next, in step S18 of FIG. 6, the modified stepwise procedure processing unit 46 defines the selected combination of variables as the input vectors. Subsequently, in step S19, the past case data storage unit 47 generates the past case data by associating the prediction target output vectors with the input vectors selected by the modified stepwise procedure processing unit 46. The past case data storage unit 47 stores the past case data at every point of time in the E/O vector database 32. The past case data storage unit 47 serving as one example of a "generating unit" executes the process in S19.

FIG. 12 illustrates an example how the data are stored in the I/O vector database 32. In FIG. 12, the input vectors each containing I-number of input variables selected by the modified stepwise procedure processing unit 46 and the prediction target output vectors are stored by being associated with each other. In the embodiment, the temperature management system can also store a plurality of output variables desired to be predicted. Note that the date & time tm in FIG. 8 is replaced by a data number km in FIG. 12.

FIG. 13A depicts another data example of the I/O vector database 32. In FIG. 13A, a horizontal direction in the table corresponds to a row arrangement per variable. A vertical direction in the table corresponds to a column arrangement per time. In the example of FIG. 13A, the variables of the input vectors are a variable of Area 23 at present, a variable of Area 68 before 210 sec, a variable of Area 61 before 300 sec, . . . , and a variable of FanB before 300 sec. The output vectors are variables of Area 31 after 30 sec. The time elapses such as t1, t2, t3, and the present time is notated by tq. In this case, the request point data are set with respect to the input vectors such as Z23 (tq), Z68 (tq−210), Z61 (tq−300), . . . , ZFanB(tq−300). As depicted in FIG. 13A, it does not mean that the variable value of the input vector is limited to the value of present time (tq), and the time values tracing back from the present time are also selectable.

FIG. 13B illustrates a data example of changing the variable in FIG. 13A to "x" from "z" and also replacing the time by the data number. Note that the variable z can be considered to be a variable representing, e.g., the data in the large-scale database 43, while the variable x can be considered to be a variable representing the input vector in the I/O vector database 32. To be specific, in FIG. 13B, data numbers k1, k2, k3, . . . are adopted in place of the times t1, t2, t3, . . . . . In FIG. 13B, x1 (k1), x2 (k2), x3 (k3), . . . , XI(kI) are used in place of Z23 (tq), Z68 (tq−210), Z61 (tq−300), . . . , ZFanB(tq−300) as the variable of Area 23 at present, the variable of Area 68 before 210 sec, the variable of Area 61 before 300 sec, . . . , and the variable of FanB before 300 sec. The variables specified by the data number kq are set as the input vectors. In other words, the temperature management system determines each variable by a combination of a type of physical quantity (a temperature per Area or a setting value of the fan and other equivalent elements) and a time delay of each physical quantity. The request point data becomes the vector of the physical quantity determined from the present time and the time delay of each variable.

FIG. 14 is a flowchart illustrating processes of the prediction processing unit 33 according to the embodiment. The prediction processing unit 33 executes a series of processes exemplified in FIG. 14 at an interval of a fixed period of time (e.g., once every 30 sec). To begin with, in step S31, the prediction processing unit 33 acquires the respective items of data from each of the air conditioner blowout temperature detecting units 22, each of the air conditioner fan airflow volume detecting units 23, each of the tile fan airflow volume detecting units 24 and the suction air temperature distribution detecting unit 21. Next, in step S32, the area segmenting unit 40 of the prediction processing unit 33 segments the suction surface of each server rack 11 into a predetermined number of segment areas. Subsequently, in step S33, the respective area maximum temperature calculation unit 41 of the prediction processing unit 33 calculates the area maximum temperature.

Next, in step S34, the request point data generating unit 51 of the prediction processing unit 33 acquires the data in accordance with the definitions of variables of the input vectors. Specifically, the request point data generating unit 51 acquires the current detected values detected by each of the air conditioner blowout temperature detecting units 22, each of the air conditioner fan airflow volume detecting units 23 and each of the fan airflow volume detecting units 24. The request point data generating unit 51 acquires the current maximum temperature data of each segment area from the respective area maximum temperature calculation unit 41. The request point data generating unit 51 acquires the past detected values corresponding to the variables with the time being delayed from the past case data in the I/O vector database 32. The request point data generating unit 51 generates the request point data by setting the acquired detected values as the input vectors at the latest time. The request point data generating unit 51 serving as an "input setting unit" executes the process in S34.

Next, in step S35, the inter-vector distance calculation unit 52 of the prediction processing unit 33 calculates an inter-vector distance between the request point data and each of the respective input vectors in the I/O vector database 32.

For example, when using a Euclidean distance, the inter-vector distance between a km-th input vector in the I/O vector database 32 and a request point vector xkq at request point time kq is calculated by a Mathematical Expression 1. The inter-vector distance calculation unit 52 serving as a "data searching unit" executes the process in S35.

$$d(k_q, k_m) = \sqrt{\sum_{i=1}^{I} \left(x_i^{k_q} - x_i^{k_m}\right)^2}$$ [Mathematical Expression 1]

Next, in step S36, the request point vicinal data searching unit 53 of the prediction processing unit 33 searches for the past case data based on the distances calculated by the inter-vector distance calculation unit 52, thus acquiring the past case data in the sequence from the smallest distance. The request point vicinal data searching unit 53 serving as the "data searching unit" executes the process in S36.

Subsequently, in step S37, the local model build-up unit 54 of the prediction processing unit 33 builds up the local model from the input vectors and the output vectors of the acquired past case data. The local model build-up unit 54 serving as one example of a "build-up unit" executes the process in S37.

Note that when the input variables of the input vectors contain the predicted variable designated by the user, it may be sufficient that the prediction processing unit 33 adds the output vector by advancing the time of the variable desired to be predicted to the time desired to be predicted.

For example, when using the multiple regression model, i.e., such a model is built up that a predicted value ykq at the request point time kq is calculated from the request point vector xkq by a Mathematical Expression 2.

$$y^{kq} = \beta_0 + \sum_{i=1}^{I} \beta_i x_i^{kq}$$ [Mathematical Expression 2]

Herein, regression moduli β0, β1, β2, . . . , βI are estimated by a least-squares method from the input vectors and the output vectors of the acquired past case data. A symbol "I" represents a number of input variables. A symbol xikq denotes an i-th input variable in the definitions of the input vectors at the request point time kq. Next, in step S38, the predicted value calculation unit 55 of the prediction processing unit 33 calculates the predicted value by use of the model built up by the local model build-up unit 54, and displays the predicted value on a display unit 114. For example, air suction temperatures at the plurality of points on the suction surface of each of the plurality of chassis are designated as the predicted values, in which case the respective air suction temperatures are displayed. The predicted value calculation unit 55 executes the process in S38 as one example of "indicating air suction temperatures at a plurality of points on a suction surface of each of a plurality of chassis".

Subsequently, in step S39, the alarm determining unit 56 of the prediction processing unit 33 instructs the alarm unit 27 to output an alarm when the predicted value of the predicted value calculation unit 55 exceeds the threshold value.

FIG. 15 is a diagram illustrating a hardware configuration of an information processing apparatus applied to the temperature management system. The information processing apparatus includes a CPU 111, a main storage device 112 and external units connected to the main storage device 112 via an interface (I/F), and executes information processes through programs. The external units can be exemplified by an external storage unit 113, a display unit 114, an operation unit 115 and a communication unit 116.

The CPU 111 (which will hereinafter be termed also a processor) runs computer programs deployed in an executable manner on the main storage device 112, thereby providing functions of the information processing apparatus. The CPU 111 runs the programs in the main storage device 112 as the prediction unit 20, the suction air temperature distribution detecting unit 21, each of the air conditioner blowout temperature detecting units 22, each of the air conditioner fan airflow volume detecting units 23, each of the tile fan airflow volume detecting units 24, the parameter setting unit 25, the prediction result indicating unit 26, and the alarm output unit 27, which are illustrated in, e.g., FIG. 3. The CPU 111 runs the programs in the main storage device 112 as the area segmenting unit 40, the respective area maximum temperature calculation unit 41, the data storage unit 42, the time delay variable generating unit 44, the stepwise procedure processing unit 45, the modified stepwise procedure processing unit 46, and the past case data storage unit 47, which are illustrated in, e.g., FIG. 4.

The main storage device 112 (which will hereinafter be termed also a memory) stores the computer programs run by the CPU 111 and the data or other equivalent information processed by the CPU 111. The main storage device 112 is exemplified by a DRAM (Dynamic Random Access Memory), an SRAM (Static Random Access Memory), a ROM (Read Only Memory), and other equivalent storages. The external storage unit 113 is used as a storage area for assisting, e.g., the main storage device 112, and stores the computer programs run by the CPU 111 and the data or other equivalent information processed by the CPU 111. The external storage unit 113 is exemplified by a hard disk drive, an SSD (Solid State Drive or Disk) and other equivalent drives. The information processing apparatus may be provided with a drive for a non-transitory detachable storage medium. The non-transitory detachable storage medium is exemplified by Blu-ray disc, a DVD (Digital Versatile Disk), a CD (Compact Disc), a flash memory and other equivalent mediums.

The information processing apparatus includes the display unit 114, the operation unit 115 and the communication unit 116. The display unit 114 is exemplified by a liquid crystal display, an electroluminescence panel and other equivalent displays. The prediction result indicating unit 26 displays a prediction result on the display unit 114. The operation unit 115 is exemplified by a keyboard, a pointing device and other equivalent devices. The embodiment exemplifies a mouse as the pointing device. The communication unit 116 transfers and receives the data to and from other devices on the network. For example, it may be sufficient that the CPU 111 acquires the air suction temperature, the setting values of the air conditioner 13, an installation value of the tile fan 17 and other equivalent values via the communication unit 116. It may also be sufficient that the CPU 111 transmits the alarm of the alarm unit 27 to a remote apparatus via the communication unit 116.

In the embodiment, as described above, the temperature management system accumulates, in the I/O vector database 32, the past case data organized to associate the output vectors containing the prediction target output variables with the input vectors containing the input variable group for expressing the prediction target by the model. The temperature management system searches the I/O vector database 32 for the past case data having a near inter-vector distance between the input vector of the past case data and the request point data defined as the current input vector. The temperature management system performs modeling by using the searched past case data, thereby executing a prediction process. Through the processes described above, the temperature management system can indicate, to the operator, the result of the future prediction that provides flexible handling about a variation of an equipment configuration, and can assist the operator for a rational operation.

In the temperature management system according to the embodiment, in addition to selecting the explanatory variable of the control factor by the stepwise procedure processing unit 45, the modified stepwise procedure processing unit 46 adds the explanatory variable other than the control factor. It is therefore feasible to build up the model while improving the accuracy to a greater degree than hitherto.

In the temperature management system according to the embodiment, the modified stepwise procedure processing unit 46, when adding the explanatory variable, maintains the control variable selected by the stepwise procedure processing unit 45 as the initial value. In other words, the process of the modified stepwise procedure processing unit 46 prevents the control variable selected by the stepwise procedure processing unit 45 from being excluded to enable modification of the explanatory variable having a less side effect.

The temperature management system according to the embodiment uses, as the input vectors, the physical quantities of the different acquisition targets at the predetermined time and the physical quantities of the same acquisition target at different points of time. In other words, owing to the process (the time delay variable generating unit 44) of generating the variable group of the time-series data with the sampling time being delayed at which the physical quantities are acquired, the physical quantities of the same acquisition target, which are acquired at different points of time, can be dealt with as the variables. The processes described above enable the temperature management system to build up the model by using the data at the time exhibiting the high contribution ratio for the output vectors.

In the temperature management system according to the embodiment, the area segmenting unit 40 segments the suction surface of the server rack 11 into the predetermined segment areas. The respective area maximum temperature calculation unit 41 calculates the maximum temperature of each segmented area. As a result of these processes, the operator can be safely guided based on the highest state (the worst value) of the temperature.

EXAMPLE

Figure 16:
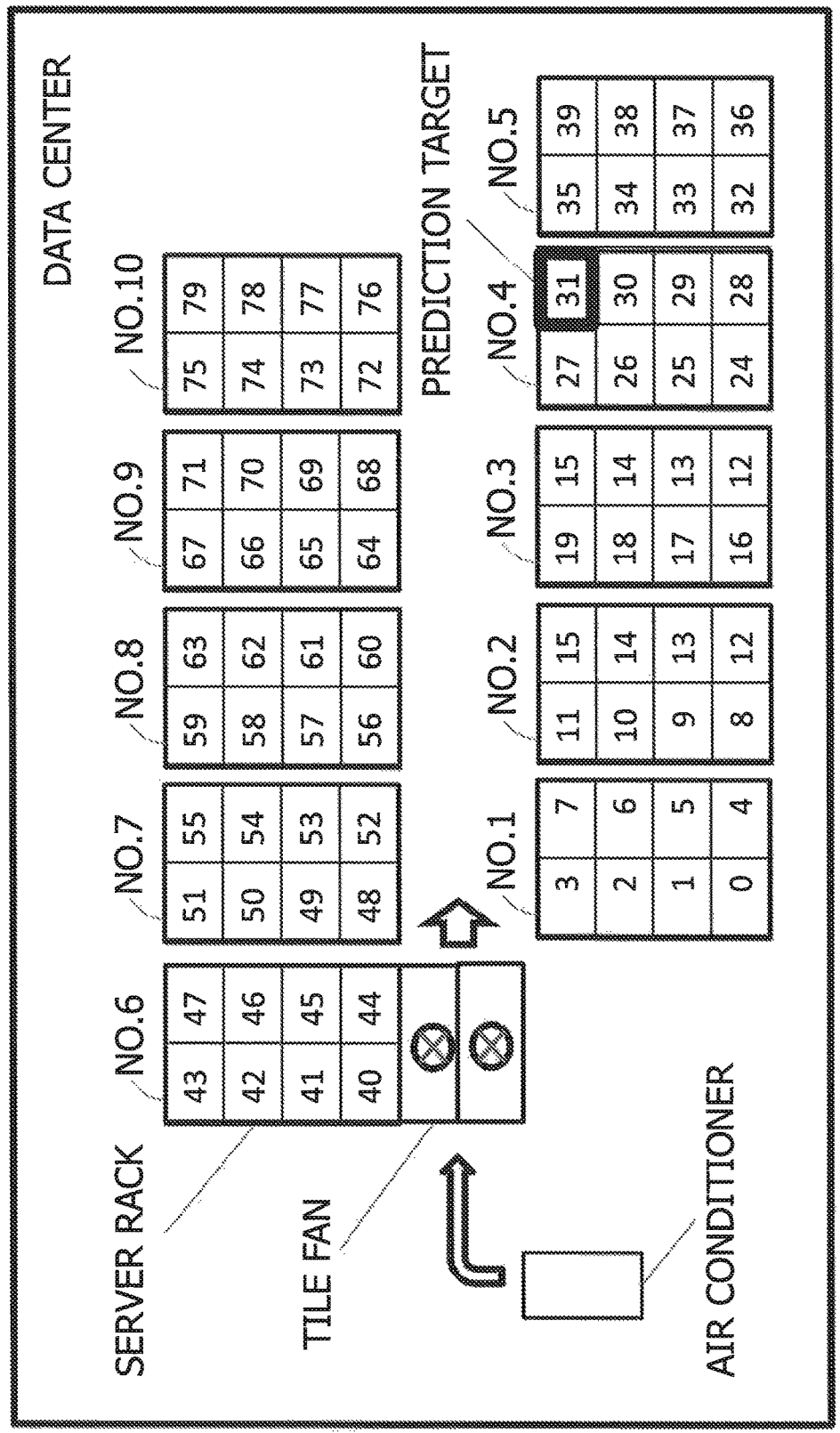
FIG. 16 is a diagram illustrating an example of segmenting an area of the data center.

An arithmetic example using the temperature management system according to the embodiment will hereinafter be described. FIG. 16 illustrates an example in which the temperature management system according to the embodiment segments the area of the data center in FIG. 2. In FIG. 16, each of the server racks 11 is segmented into eight segment areas. In the Example, the prediction target temperature is to be an air suction temperature of the Area 31 after 5 min.

This Example uses the time-series data when varying the tile fans FanA and FanB. Herein, the blowout temperature and the blowout airflow volume of the air conditioner are to take fixed values.

FIG. 17 illustrates results of selecting the input variables from all the variables by the normal stepwise procedure, as a conventional input variable selection instance. The FanA (the airflow volume thereof) is herein selected for the control variable, while the FanB (the airflow volume thereof) is not selected. However, the prediction target Area 31 is an area that is physically affected by the FanB. Thus, it happened in the conventional selection of the variable that both of the FanA and the FanB having a causal relationship in a physical sense were not necessarily selected with respect to the control variable. In other words, the model did not necessarily sufficiently take account of the influence of the control variable in the conventional selection of the variable. It is desirable for conducting the control assistance to build up the local model enabled to take account of the influence of the control variable.

Such being the case, the temperature management system in the Example implements the normal stepwise procedure about the control variable defined as the variable becoming the operation factor. FIG. 18 illustrates a combination of variables selected based on the results thereof. Herein, it is recognized that the FanA at the present, the FanB at the present, the FanA before 30 sec and the FanB before 300 sec have a high relevancy with the prediction target. Subsequently, the temperature management system selects a combination of variable other than the control variable by the modified stepwise procedure in addition to the four selected control variables.

Incidentally, the normal stepwise procedure has a function of excluding the selected variable with the contribution ratio being conversely decreased by continuously adding the variables on the presumption of using the regression model. This function is exemplified by the processes in S47-S50 of FIG. 10. Such an excluding function excludes the control variable from the final combination of variables as the case may be. The modified stepwise procedure processing unit 46 modifies a determination condition not to exclude the previously added control variable as instanced in S62 of FIG. 11. FIG. 19 illustrates the combination of variables selected based on the results by the modified stepwise procedure. In FIG. 19, Area 23 at the present, Area 68 at 210 sec and other equivalent Areas are selected, thereby obtaining the results different from those in FIG. 15. Thus, the modified stepwise procedure processing unit 46 has an enhanced possibility of building up the input vectors by combining the variables containing the control variables having the causal relationship in the physical sense.

Figure 20:
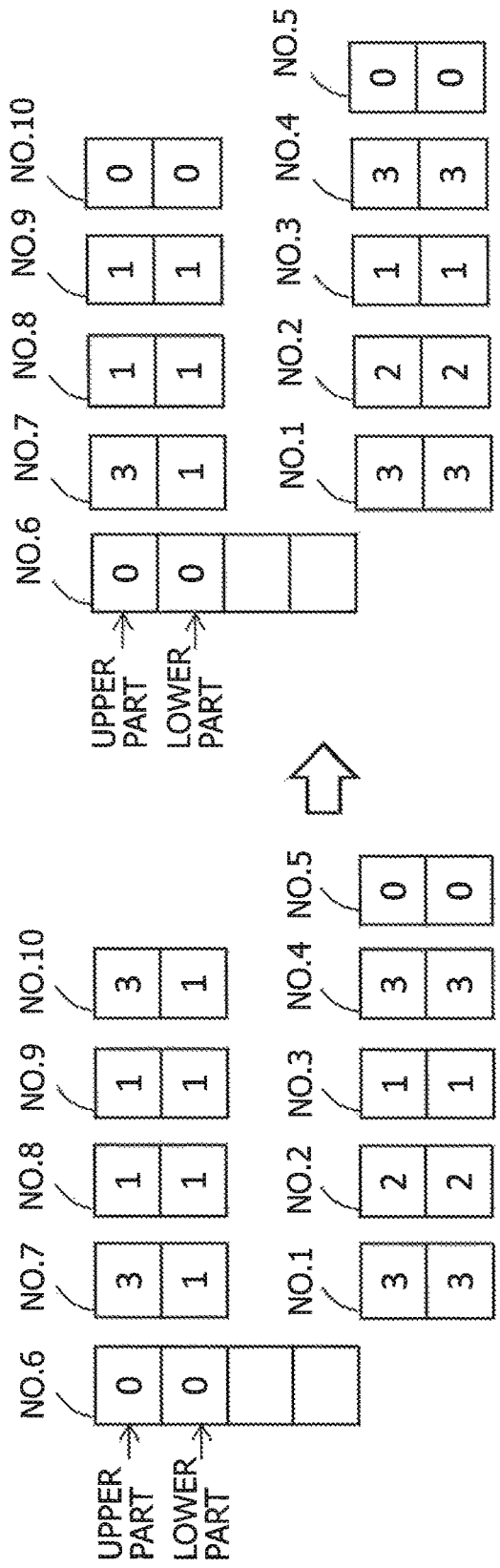
FIG. 20 is a diagram illustrating an equipment operating state.

For making a comparative evaluation of prediction performance against variations of the equipment configuration, an evaluation of post-varying prediction is made by varying an operating state of the equipment. FIG. 20 illustrates the operating state of the equipment.

FIG. 20 is the diagram of arrangement of the server racks 11, in which values of loads on the computers are indicated on the unit of kW. The loads on the computers are indicated in separation into upper parts and a lower parts of the server racks 11. In FIG. 20, a left side represents the values before being varied, while a right side represents the values after being varied. In FIG. 20, a numeral "0" indicates power-OFF, and the numerals 1, 2, 3 indicate power consumptions on the unit of kW. In the instance of FIG. 20, there is a variation of the operating state of the server rack 11 specified by No. 10.

A conventional procedure 1 predicts a temperature of Area 31 from the airflow volume of the FanA and the airflow volume of the FanB by using a transfer function in Mathematical Expression 3.

$$y_{est} = G_1(s)u_{FanA} + G_s(s)u_{FanB} \quad \text{[Mathematical Expression 3]}$$

$$G_1(s) = \frac{K_{p1}}{1+T_{p1}s}e^{-T_{d1}s}$$

$$G_2(s) = \frac{K_{p2}}{1+T_{p2}s}e^{-T_{d2}s}$$

Figure 21:
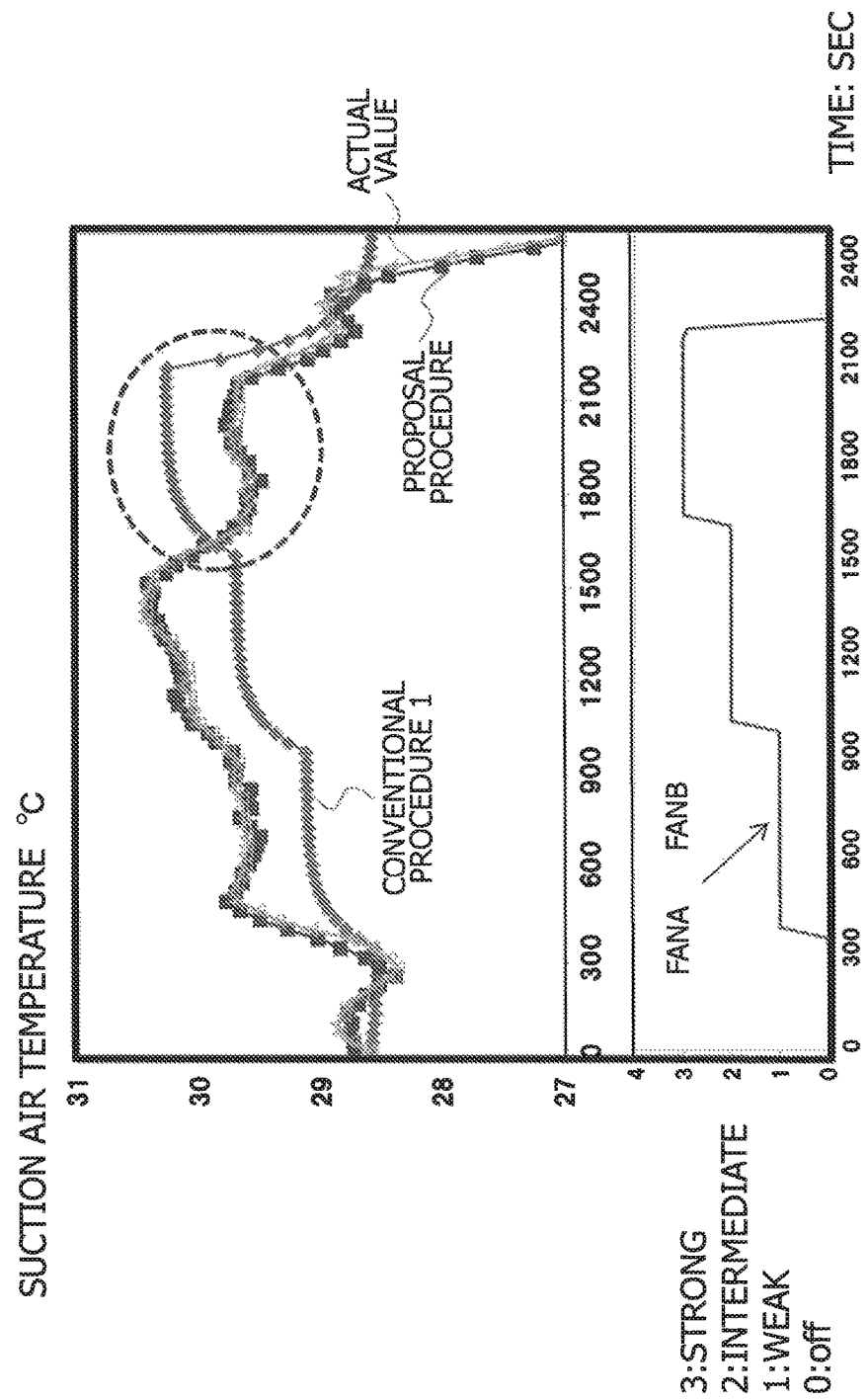
FIG. 21 is a diagram illustrating comparative results about prediction results by the temperature management system according to an embodiment and by a conventional procedure 1.

FIG. 21 illustrates comparative results about the prediction results by the temperature management system and by the conventional procedure 1. FIG. 21 indicates the results of performing the predictions after 30 sec at an interval of 30 sec. The actual values contain noises, and hence a window width 6, i.e., a moving average for six pieces of sample data is conducted in FIG. 21. Note that setting values of the FanA and the FanB are given in a lower part of FIG. 21. In other words, it is illustrated that both of the FanA and the FanB vary at three stages.

The actual value decreases from after a period of time "1800 sec" in a proposal procedure but increases in the conventional procedure 1. On the other hand, it is recognized that the proposal procedure can attain recurrence of the descent at the same point of time as the actual value decreases. A root mean square error (RMSE) is 0.757 in the conventional procedure 1 and 0.116 in the proposal procedure. The proposal procedure according to the Example enables this prediction to be made on condition that the post-varying operation data of the operating state of the equipment is acquired even once.

Another set of comparative results with a conventional procedure 2 will be illustrated. The conventional procedure 2 calculates a prediction value YTF by Mathematical Expression 4 from a prediction value yest(k) of the transfer function at the present, a prediction value yest(k−1) before one period and an actual value yactual(k−1) before one period.

$$YTF=yest(k)+(yactual(k-1)-yest(k-1))$$ [Mathematical expression 4]

Mathematical Expression 4 modifies the prediction value yest(k) at the present by a difference (offset) between the actual value before one period and the prediction value before one period.

Figure 22:
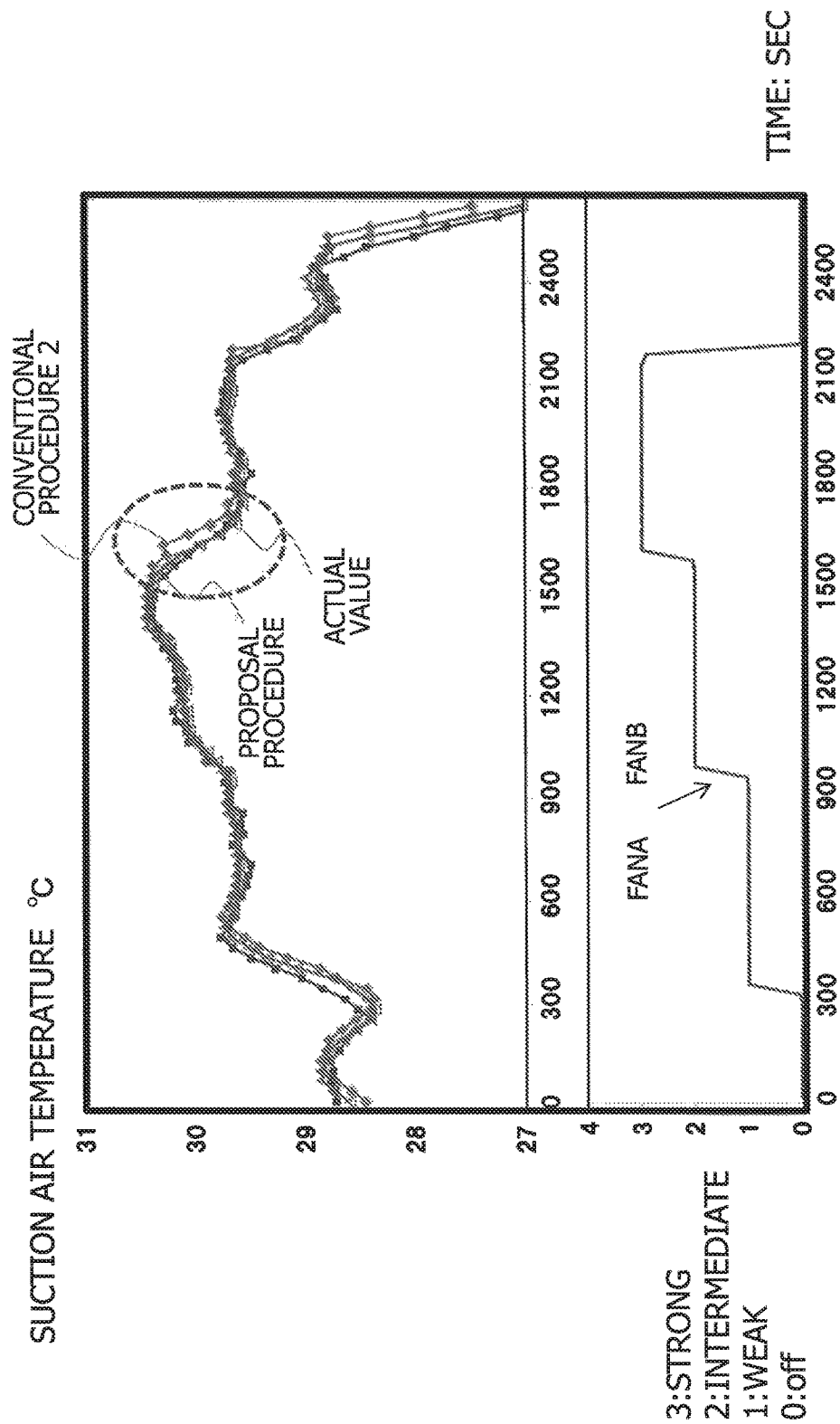
FIG. 22 is a diagram illustrating comparative results about prediction results by the temperature management system according to the embodiment and by a conventional procedure 2.

FIG. 22 illustrates a diagram for comparing the prediction results by the conventional procedure 2 with the prediction results by the temperature management system according to the embodiment. In FIG. 22, the setting values of the FanA and the FanB are the same as in the case of FIG. 21. It is understood that the prediction value by the conventional procedure 2 follows after a past actual value with a time delay (a primary delay). It is also recognized that the prediction results in the embodiment do not exhibit any primary delay but attain the high prediction accuracy. Herein, the root mean square error (RMSE) is 0.144 in the conventional procedure 2 and 0.116 in the proposal procedure of the Example.

Figure 23:
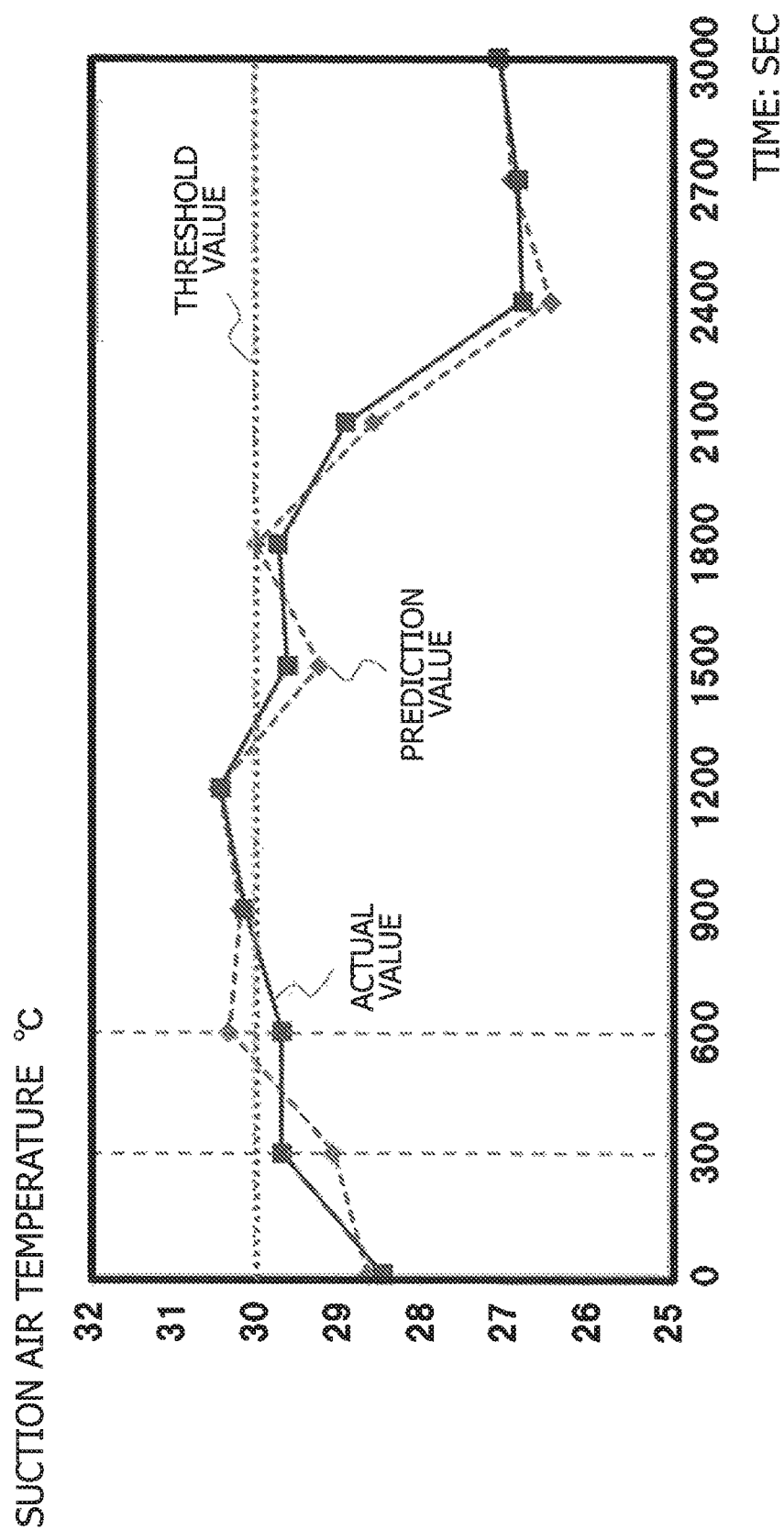
FIG. 23 is a diagram illustrating a prediction example of the temperature management system according to the embodiment.

FIG. 23 illustrates a prediction instance by the temperature management system according to the embodiment. FIG. 23 illustrates the instance of making the prediction after 5 min at an interval of 5 min. A threshold temperature for causing the alarm unit 27 to output the alarm is set at 30° C. When the threshold temperature is 30° C., it is predicted that the temperature will be over 30° C. after 300 sec at a point of the time "300 sec", in which case the temperature management system can perform the control assistance to prompt the operator to take an action by previously sounding the alarm to notify the operator.

Figure 24:
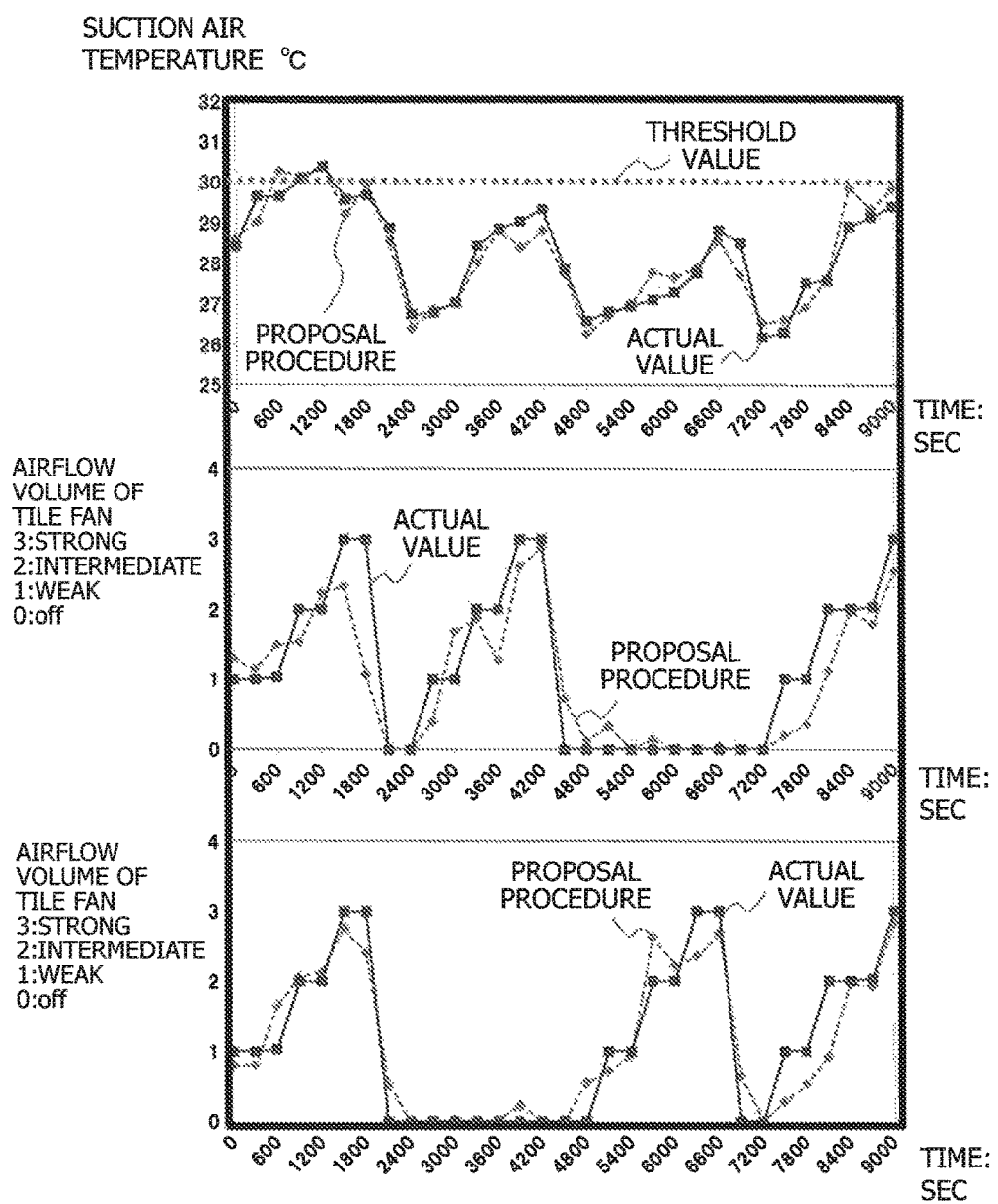
FIG. 24 is a diagram illustrating a prediction value of operation of a tile fan in relation to a prediction value of an air suction temperature.

FIG. 24 illustrates a prediction value of the operation of the tile fan in relation to the prediction value of the air suction temperature. FIG. 24 illustrates an instance of performing the prediction after 5 min at the interval, of 5 min. As indicated by the prediction value of the airflow volume of the tile fan, it is recognized that the temperature management system can predict a tendency, which is substantially approximate to the actual value. In the Example, however, the airflow volume of the tile fan, which is a control factor and is also a factor that can be varied by the operator or the controller without any restriction, is not therefore necessarily a proper airflow volume as the prediction target. However, the airflow volume of the tile fan can be understood as information of the control value when becoming a value of the future air suction temperature, and the temperature management system can provide the operator with the information of the control value when becoming the value of the future air suction temperature.

A conventional prediction model based on the transfer function has occurrence of an error between the prediction value of the prediction model and the actual value and occurrence of a problem of decreased prediction performance for the control assistance when the configuration of the equipment varies. The temperature management system according to the embodiment accumulates, in the I/O vector database 32, the past case data organized to associate the output vectors containing the prediction target variables with the input vectors containing the input variable group for expressing the prediction targets. The temperature management system searches the I/O vector database 32 for the past case data having the near inter-vector distance between the input vector of the past case data and the current input vector (request point data). The temperature management system performs modeling to build up the local model by using the searched past case data. The result of the future prediction, which provides the flexible handling about the variation of the equipment configuration, can be indicated to the operator, thus making it possible to assist the operator in performing the rational operation.

Modified Example

The embodiment discussed above has applied the stepwise procedure and the modified stepwise procedure to the temperature management system. The air suction temperatures and other equivalent values of the servers 12 mounted in the server racks 11 at, e.g., the data center have been predicted. It does not, however, mean that the processes exemplified in the embodiment are limited to the temperature management system applied to the servers and other equivalent apparatuses at the data center. The temperature management system according to the embodiment can be applied to, e.g., apparatuses generating the heat and a general type of cooling systems thereof.

For instance, the processes of calculating the prediction value in the embodiment, which encompasses the stepwise procedure and the modified stepwise procedure, can be applied to a system in which to measure a given physical quantity and to acquire another physical quantity affecting the former physical quantity or a control quantity by a control apparatus, a setting value and other equivalent values. The processes according to the embodiment can be applied to systems in which a gas having a target concentration is introduced into the equipment. To be specific, the exemplified system acquires measured values of concentrations in respective positions, a setting value of blowout quantity of the gas when introducing the gas, a setting value of discharge pressure of the gas, a setting value of airflow volume of a fan to circulate the gas or a setting value of driving quantity of a compressor, and other equivalent values within the equipment. It may be sufficient that this system predicts the gas concentration in a desired position in the same procedure as by the temperature management system according to the embodiment.

According to the present invention, it is feasible to restrain the decrease in prediction performance of the physical quantities even when the configuration and the state of the prediction target vary because of enabling a model to be built up by selecting a proper input variate group.

<Non-Transitory Recording Medium>

A program for making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and execute the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM (Compact Disc-Read Only Memory), a CD-R (Recordable), a DVD (Digital Versatile Disk), a Blu-ray disc, a DAT (Digital Audio Tape), an 8 mm tape, and a memory card like a flash memory. A hard disc, a ROM (Read-Only Memory) and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a database configured to store a plurality of physical quantities acquired in time-series together with time;
   a processor; and
   a memory storing a program causing the processor to execute:
     acquiring the plurality of physical quantities in time-series;
     extracting a plurality of variates relating to physical quantities to be predicted;
     selecting a first variate from the plurality of variates to minimize errors between actual values of at least one physical quantity and prediction values of a first model;
     selecting a second variate from the plurality of variates to minimize errors between the actual values and prediction values of a second model, the first variate and the second variate relating to different physical quantities or different timings of a same physical quantity;
     acquiring, from the database, past case data of the physical quantities corresponding to the first and second variate;
     generating an input variate group from the acquired past case data;
     when a prediction is requested
       setting measured values of the a first physical quantity corresponding to the first variate and a second physical quantity corresponding to the second variate as input vectors for the prediction;
       calculating inter-vector distances between the set input vectors and input vectors of the generated input variate group;
       searching for predetermined pieces of past case data in a sequence from the shortest of the inter-vector distances;
       building up the second model using the predetermined pieces of searched past case data; and
       predicting values of the plurality of physical quantities using the second model.

2. The information processing apparatus according to claim 1, wherein the processor further executes
   calculating a contribution ratio of each of the plurality of variates contributing to the prediction values of the first model;
   determining whether the contribution ratio reaches a reference value; and
   excluding variates having the contribution ratio not reaching the reference value.

3. The information processing apparatus according to claim 1, wherein the plurality of physical quantities include air suction temperatures at a plurality of points on a suction surface of each of a plurality of chassis with air being sucked from the surface and discharged from an exhaust surface, a control value of an air conditioner to discharge cool air into an air space accommodating the plurality of chassis installed therein, and a control value of an air blower to blow out the cool air discharged from the air conditioner to the suction surface, and
   the processor further executes indicating the air suction temperatures at the plurality of points on the suction surface of each of the plurality of chassis.

4. The information processing apparatus according to claim 1, wherein the processor further executes generating a variate group of time-series data organized to delay a period of sampling time with the physical quantities being acquired, the physical quantities containing a set of physical quantities, acquired at a predetermined point of time, of different acquisition targets, and another set of physical quantities, acquired at different points of time, of the same acquisition target.

5. The information processing apparatus according to claim 1, wherein the processor further executes:
   segmenting a chassis into a predetermined number of areas in which the plurality of physical quantities include temperature measurements; and
   calculating a maximum value of intra-area measuring points of temperature per sampling time; and
   setting the maximum value as an area temperature.

6. The information processing apparatus according to claim 1, wherein the processor further executes controlling at least one physical quantity within a chassis housing at least one computer based on the predicted values of the second model.

7. The information processing apparatus according to claim 1, wherein the processor selects the second variate based on the prediction of the first model.

8. An information processing method comprising:
   acquiring the plurality of physical quantities in time-series;
   extracting a plurality of variates relating to physical quantities to be predicted;
   selecting a first variate from the plurality of variates to minimize errors between actual values of at least one physical quantity and prediction values of a first model;

selecting a second variate from the plurality of variates to minimize errors between the actual values and prediction values of a second model, the first variate and the second variate relating to different physical quantities or different timings of a same physical quantity;

acquiring, from the database, past case data of the physical quantities corresponding to the first and second variate;

generating an input variate group from the acquired past case data;

when a prediction is requested
   setting measured values of the a first physical quantity corresponding to the first variate and a second physical quantity corresponding to the second variate as input vectors for the prediction;
   calculating inter-vector distances between the set input vectors and input vectors of the generated input variate group;
   searching for predetermined pieces of past case data in a sequence from the shortest of the inter-vector distances;
   building up the second model using the predetermined pieces of searched past case data; and
   predicting values of the plurality of physical quantities using the second model.

9. A non-transitory computer-readable recording medium having stored therein a program causing a computer to execute a process comprising:

acquiring the plurality of physical quantities in time-series;

extracting a plurality of variates relating to physical quantities to be predicted;

selecting a first variate from the plurality of variates to minimize errors between actual values of at least one physical quantity and prediction values of a first model;

selecting a second variate from the plurality of variates to minimize errors between the actual values and prediction values of a second model, the first variate and the second variate relating to different physical quantities or different timings of a same physical quantity;

acquiring, from the database, past case data of the physical quantities corresponding to the first and second variate;

generating an input variate group from the acquired past case data;

when a prediction is requested
   setting measured values of the a first physical quantity corresponding to the first variate and a second physical quantity corresponding to the second variate as input vectors for the prediction;
   calculating inter-vector distances between the set input vectors and input vectors of the generated input variate group;
   searching for predetermined pieces of past case data in a sequence from the shortest of the inter-vector distances;
   building up the second model using the predetermined pieces of searched past case data; and
   predicting values of the plurality of physical quantities using the second model.

* * * * *